(12) United States Patent
Yeung et al.

(10) Patent No.: US 7,541,012 B2
(45) Date of Patent: Jun. 2, 2009

(54) CATALYTIC MATERIAL AND METHOD OF PRODUCTION THEREOF

(75) Inventors: King Lun Yeung, Clear Water Bay (HK); Nan Yao, Clear Water Bay (HK); Ka Yee Ho, Yuen Long (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 889 days.

(21) Appl. No.: 10/885,968

(22) Filed: Jul. 7, 2004

(65) Prior Publication Data

US 2006/0009354 A1 Jan. 12, 2006

(51) Int. Cl.
*C07C 11/24* (2006.01)
*B01D 53/02* (2006.01)
*B01J 23/00* (2006.01)
*B01J 21/00* (2006.01)

(52) U.S. Cl. .................... 423/245.1; 423/247; 502/243; 502/247; 502/255; 502/256; 502/257; 502/258; 502/259; 502/260; 502/261; 502/262; 502/309; 502/314; 502/315; 502/316; 502/317; 502/318; 502/319; 502/320; 502/321; 502/322; 502/323; 502/324; 502/326; 502/327; 502/330; 502/331; 502/333; 502/334; 502/335; 502/336; 502/337; 502/338; 502/339; 502/344; 502/345; 502/346; 502/347; 502/348; 502/349; 502/350; 502/351; 502/353

(58) Field of Classification Search ............... 502/240, 502/241, 243, 244, 247, 254, 255, 256, 257, 502/258, 259, 260, 261, 262, 305, 308, 309, 502/313, 314, 315, 316, 317, 318, 319, 320, 502/321, 322, 323, 324, 327, 330, 331, 332, 502/333, 334, 335, 336, 337, 338, 339, 345, 502/346, 347, 348, 349, 350, 351, 352, 353, 502/354, 355, 415, 439
See application file for complete search history.

(56) References Cited

U.S. PATENT DOCUMENTS

| | | | | |
|---|---|---|---|---|
| 5,318,757 | A | * | 6/1994 | Abe et al. .................... 422/174 |
| 5,591,414 | A | * | 1/1997 | Jacob et al. .................. 422/180 |
| 5,811,064 | A | * | 9/1998 | Kojima et al. ............... 422/180 |
| 5,830,421 | A | * | 11/1998 | Gardner et al. ........... 423/213.2 |
| 5,882,607 | A | * | 3/1999 | Miyadera et al. ............ 422/177 |
| 5,928,981 | A | * | 7/1999 | Leyrer et al. .................. 502/64 |
| 6,217,831 | B1 | * | 4/2001 | Suzuki et al. ................ 422/177 |
| 6,231,817 | B1 | * | 5/2001 | Shimoda et al. ............. 422/177 |
| 6,375,910 | B1 | * | 4/2002 | Deeba et al. .............. 423/239.1 |
| 6,432,526 | B1 | | 8/2002 | Arney et al. ................. 428/328 |
| 6,468,491 | B1 | | 10/2002 | Foury et al. .............. 423/245.1 |
| 6,491,880 | B1 | * | 12/2002 | Wang et al. ................. 422/211 |

(Continued)

FOREIGN PATENT DOCUMENTS

BG 0104186 A 9/2001

(Continued)

OTHER PUBLICATIONS

Haruta; "Size- and support-dependency in the catalysis of gold"; (1997); *Catalysis Today*; 36: 153-166.

(Continued)

*Primary Examiner*—Cam N. Nguyen
(74) *Attorney, Agent, or Firm*—Wilkinson & Grist; George G. Wang

(57) ABSTRACT

The present invention features a catalytic material which includes a metal catalyst anchored to a nano-sized crystal containing a metal oxide. Furthermore, the present invention features a method of producing the catalytic material described herein. Finally, the present invention features using the catalytic material for removing contaminants and for getting the desired products.

15 Claims, 31 Drawing Sheets

U.S. PATENT DOCUMENTS

| | | | | |
|---|---|---|---|---|
| 6,497,848 B1* | 12/2002 | Deeba et al. | ............... | 422/180 |
| 6,500,392 B2* | 12/2002 | Mizuno et al. | ............... | 422/177 |
| 6,576,199 B1* | 6/2003 | Liu et al. | ............... | 422/177 |
| 6,645,439 B2* | 11/2003 | Zhang et al. | ............... | 422/177 |
| 6,660,237 B2* | 12/2003 | Wang et al. | ............... | 422/222 |
| 6,869,573 B2* | 3/2005 | Abe et al. | ............... | 422/180 |
| 6,916,450 B2* | 7/2005 | Akama et al. | ............... | 422/180 |

FOREIGN PATENT DOCUMENTS

| | | |
|---|---|---|
| EP | 0 361 385 | 4/1990 |
| JP | 1994-182218 | 7/1994 |
| JP | 2000-109343 | 4/2000 |
| JP | 2002-054370 | 2/2002 |
| WO | WO 01/41926 A1 | 6/2001 |
| WO | WO 03/061862 A1 | 7/2003 |
| WO | WO 03/062217 A1 | 7/2003 |

OTHER PUBLICATIONS

Hayashi, et al.; "Selective Vapor-Phase Epoxidation of Propylene over Au/TiO$_2$ Catalysts in the Presence of Oxygen and Hydrogen"; (1998); *Journal of Catalysis*; 178: 566-575.

Haruta and Date; "Advances in the catalysis of Au nanoparticles"; (2001); *Applied Catalysis A: General*; 222: 427-437.

van Santen, et al.; "Preparation of supported catalysts. Catalysis: An Integrated Approach"; (1999); *Elsevier second edition*; 123(10): 459-485.

Iida, et al.; "Raman Spectrum of Ultrafine Anatase Powders Drived from Hydrolysis of Alkoxide"; (1998); *Applied Spectroscopy*; 52(5): 673-678.

Nyquist, et al., Infrared and Raman Spectral Atlas of Inorganic Compounds and Organic Salts: Raman Spectra; (1996); *The Handbook of Infrared and Raman Spectra of Inorganic Compounds and Organic Salts*; 2: 102-103.

Bond and Tahir; "Vanadium oxide monolayer catalysts: Preparation, characterization and catalytic activity"; (1990); *Elsevier Science Publishers B.V. Amsterdam: Review*; 1-31.

Ayllon, et al.; "Preparation of anatase powders from fluorine-complexed titanium(iv) aqueous solution using microwave irradiation"; (2000); *J. Mater. Chem.*; 10: 1911-1914.

Maira, et al.; "Gas-phase photo-oxidation of toluene using nanometer-size TiO$_2$ catalysts"; (2001); *Applied Catalysis B: Environmental*; 29: 327-336.

Maira, et al.; "Fourier Transform Infrared Study of the Performance of Nanostructured TiO$_2$ Particles for the Photocatalytic Oxidation of Gaseous Toluene"; (2001); *Journal of Catalysis*; 202: 413-420.

Peiro, et al.; "Low-Temperature Deposition of TiO$_2$ Thin Films with Photocatalytic Activity from Colloidal Anatase Aqueous Solutions"; (2001); *Chem. Mater.*; 13: 2567-2573.

Maira, et al.; "Size Effects in Gas-Phase Photo-oxidation of Trichloroethylene Using Nanometer-Sized TiO$_2$ Catalysts"; (2000); *Journal of Catalysis*; 192: 185-196.

Hester and Harrison; "Volatile Organic Compounds in Indoor Air"; (1995); *The Royal Society of Chemistry—Issues in Environmental Science and Technology*; 107-124.

Zhao and Yang; "Photocatalytic oxidation for indoor air purification: a literature review"; (2003); *Building and Environment*; 38: 645-654.

Mills and Hunte; "An overview of semiconductor photocatalysis"; (1997); *Journal of Photochemistry and PhotobiologyJournal of Photochemistry and Photobiology A: Chemistry*; 108: 1-35.

Ibrahim and Lasa; "Photo-catalytic conversion of air borne pollutants Effect of catalyst type and catalyst loading in a novel photo-CREC-air unit"; (2002); *Applied Catalysis B: Environmental*; 38: 201-213.

Choi, et al.; "Investigation on TiO$_2$-coated optical fibers for gas-phase photocatalytic oxidation of acetone"; (2001); *Applied Catalysis B: Environmental*; 31: 209-220.

1998 Joint Committee on Powder Diffraction Standards—International Centre for Diffraction Data.

* cited by examiner

Amorphorous first metal oxide gel sphere

First metal oxide crystals (A)

(B)   (E)

(C)   (F)

(D)   (G)

CATALYTIC MATERIAL AND METHOD OF PRODUCTION THEREOF

FIELD OF INVENTION

The present invention is related to supported metal catalysts. In particular, the present invention is related to supported metal catalysts with nanostructures that can oxidize harmful contaminants in the absence of UV illumination.

BACKGROUND OF INVENTION

Volatile organic compounds (VOCs) and carbon monoxide (CO) in the air are contaminants and are harmful to human health. Methods have been developed to eliminate the contaminants.

Supported metal catalysts are found to be effective in low-temperature oxidation of CO and hydrocarbons and selective oxidation of propylene. (M. Haruta, *Catal. Today* 36: 153 (1997); M. T. Hayashi, K. Tanaka and M. Haruta, *J. Catal* 178: 566 (1998).; M. Haruta and M. Date, *Appl. Catal. A: Gen.* 222: 427 (2001).)

Supported metal catalysts usually comprise nano-sized metal particles attached to a metal oxide support. One disadvantage of the supported metal catalysts is the low catalytic activity at low temperatures. Another disadvantage of the current supported metal catalysts is the short life of the catalyst as the metal atoms tend to sinter on the surface of the support, forming clusters of metals. Once the metal atoms are aggregated in clusters, their catalytic activity will be significantly reduced. In addition, the metal atoms are also susceptible to poisoning by halide- and sulfur-containing compounds.

SUMMARY OF INVENTION

The present invention provides a catalytic material comprising a metal catalyst anchored to a metal oxide crystal.

One aspect of the present invention provides a catalytic material including a metal catalyst that has high metal dispersion, yet prevents the sintering phenomenon, thereby the catalytic material of the present invention is stable and active for an extended period of time.

In one embodiment, the catalytic material comprises a first metal oxide and a metal catalyst attached to the surface of the first metal oxide as represented by formula (C) and (D) (See also FIGS. 1C and 1D). The metal catalyst becomes anchored to the surface by interacting with the hydroxyl group on the surface of the first metal oxide. The first metal oxide is in crystal form ($M_1O$, see formula (A)) that serves as a support for the metal catalyst. Preferably, the crystal form of the first metal oxide has a size of about 3 to about 25 nm, more preferably, about 6 to about 15 nm. Also preferably, the crystallinity of the first metal oxide is greater than about 50%, or about 60%, or about 70%. Further preferably, the crystal structure of the first metal oxide can be anatase, wherein rutile can comprise about 0 to about 30% by weight. In a preferred embodiment, the first metal oxide is one selected from the group consisting of $TiO_2$, $SiO_2$, $Al_2O_3$, $ZrO_2$, and $WO_3$. In a more preferred embodiment, the first metal oxide is $TiO_2$.

In another embodiment, the catalytic material comprises a first metal oxide, a second metal oxide, and a metal catalyst as represented by formula (G). The metal catalyst becomes anchored to the surface by interacting with the hydroxyl group on the surface of the first metal oxide whereas the second metal oxide is directly anchored to the surface of the first metal oxide. The first metal oxide is in crystal form ($M_1O$, see formula (A)) that serves as a support for the metal catalyst. Preferably, the crystal form of the first metal oxide has a size of about 3 to about 25 nm, more preferably, about 6 to about 15 nm. Also preferably, the crystallinity of the first metal oxide is greater than about 70%. Further preferably, the crystal structure of the first metal oxide can be anatase, wherein rutile can comprise about 0 to about 30% by weight. In a preferred embodiment, the first metal oxide is one selected from the group consisting of $TiO_2$, $SiO_2$, $Al_2O_3$, $ZrO_2$, and $WO_3$. In a more preferred embodiment, the first metal oxide is $TiO_2$.

The second metal oxide serves as a blocking agent that blocks the migration of the metal catalyst on the surface of the first metal oxide even in the presence of the hydroxyl groups on the surface of the first metal oxide. Preferably, the second metal oxide is deposited before the metal catalyst is deposited onto the surface of the first metal oxide. More preferably, the second metal oxide is in monomeric or oligomeric form or the mixture thereof. Most preferably, at least about 60% of the second metal oxide is monomeric. The second metal oxide can be selected from any metal oxides that can form monomeric or oligomeric layers. Preferably, vanadium oxide or manganese oxide or chromium oxide or molybdenum oxide is selected as the second metal oxide. The loading of the second metal oxide on the first metal oxide is preferably about 0.25 to about 0.5 Langmuir. i.e., about 25 to about 50% of the first metal oxide surface is covered by the second metal oxide.

In each of the above embodiments, the metal catalyst normally comprises a transitional metal or the salt thereof. Preferably, the metal in the metal catalyst is one selected from the group consisting of Fe, Co, Ni, Ru, Rh, Pd, Os, Ir, Pt, Au, Ag, and Cu. More preferably, Au or Pt or the mixture thereof is used in the metal catalyst. Preferably, the loading of the metal catalyst on the first metal oxide is preferably in the range of about 0.01 to about 2.5% by weight, more preferably about 0.7 to about 2% by weight.

Another aspect of the present invention provides a method of producing the catalytic material. In one embodiment, the present invention provides a method for producing a catalytic material comprising: (a) forming amorphous material of the first metal oxide; (b) crystallizing the first metal oxide into nano-sized particles, preferably about 3 to about 16 nm in size; (c) controlling the level of surface hydration of the first metal oxide particles to a range of about 5 to about 100 mg per gram of the dry first metal oxide; (d) depositing a metal catalyst precursor to the first metal oxide; (e) converting the metal catalyst precursor to active metal catalyst; and (f) removing the excessive hydroxyl groups from the surface of the first metal oxide.

In an alternative embodiment, the present invention provides another method of producing a catalytic material comprising: (a) forming amorphous material of the first metal oxide; (b) crystallizing the first metal oxide into nano-sized particles, preferably about 3 to about 16 nm in size; (c) controlling the level of surface hydration of the first metal oxide particles to a range of about 5 to about 100 mg per gram of the dry first metal oxide; (d) depositing a monomeric or oligomeric or the mixture thereof second metal oxide to the surface of the first metal oxide; (e) depositing a metal catalyst precursor to the first metal oxide; (f) converting the metal catalyst precursor to active metal catalyst; and (g) removing the excessive hydroxyl groups from the surface of the first metal oxide.

Another aspect of the present invention provides use of the catalytic material. In particular, the catalytic material of the present invention is useful in purifying the air by removing from the air the contaminants containing toxic organic, inorganic, and/or biological species. In one embodiment, the catalytic material of the present invention is contacted with a sample (such as an airflow) and reduction in the level of contaminants are detected.

BRIEF DESCRIPTION OF THE DRAWINGS

FIG. 1A represents a metal oxide particle with controlled level of surface hydration; FIG. 1B is a metal catalytic intermediate formed after depositing metal catalyst precursor to the first metal oxide; FIG. 1C is a catalytic material comprising the first metal oxide and the metal catalyst; FIG. 1D represent the product after the step of removing the excessive hydroxyl groups; FIG. 1E shows the deposition of a monomeric or oligomeric or the mixture thereof second metal oxide onto the first metal oxide; FIG. 1F is an intermediate resulted after depositing metal catalyst precursor to the first metal oxide; and FIG. 1G represents the product after converting the metal catalyst precursor to activate metal catalyst.

DETAILED DESCRIPTION

As used herein, the singular forms "a," "an," and "the" used in the specification and claims include both singular and plural referents unless the content clearly dictates otherwise.

Catalytic Material

One aspect of the present invention provides a catalytic material including a metal catalyst that has high metal dispersion, yet prevents the sintering phenomenon, thereby the catalytic material of the present invention is stable and active for an extended period of time.

Figure 1A:
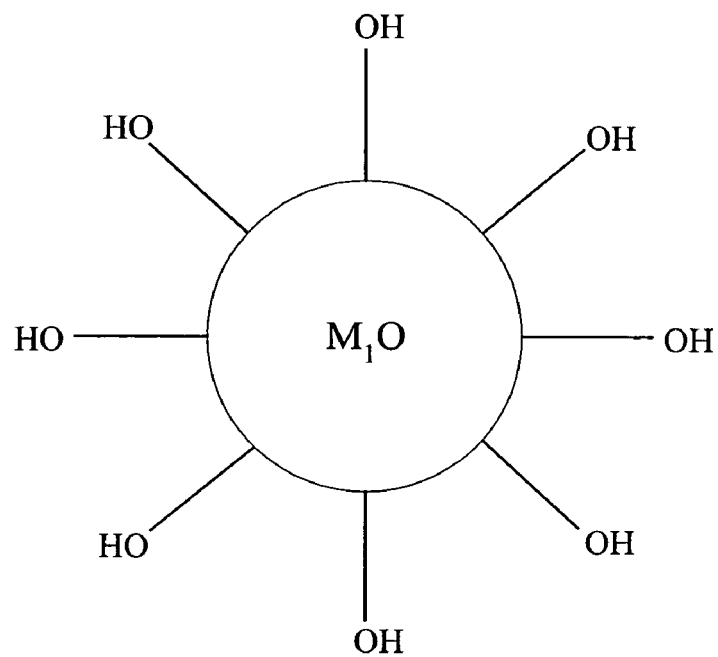
FIGS. 1A-G are schematic diagrams illustrating compounds that are formed during various steps of the present invention. Specifically.
Figure 1B:
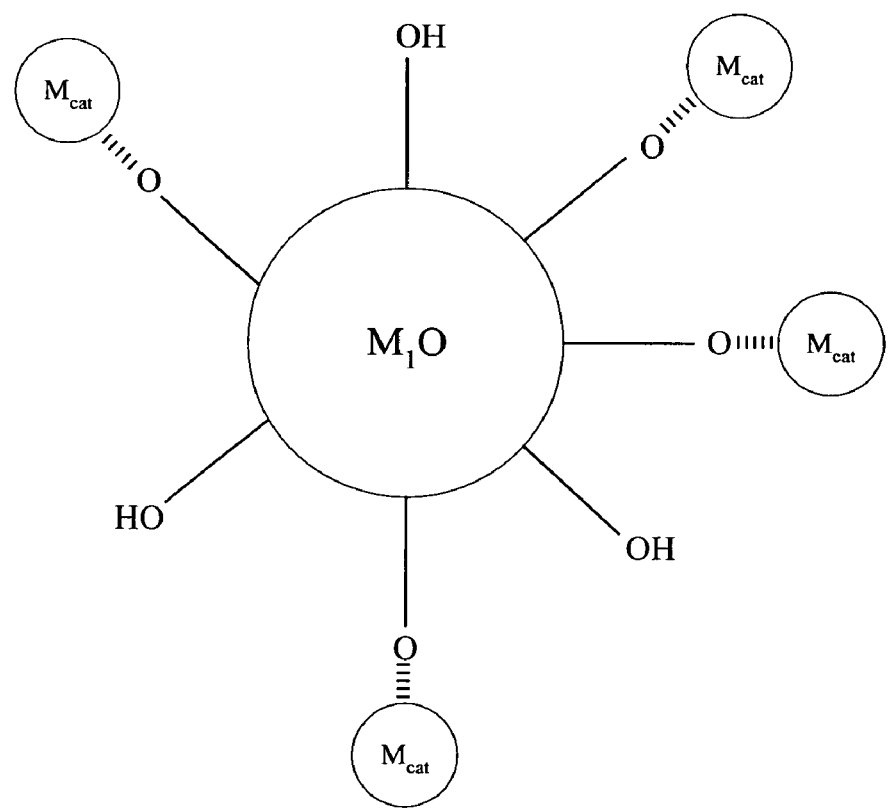
Figure 1C:
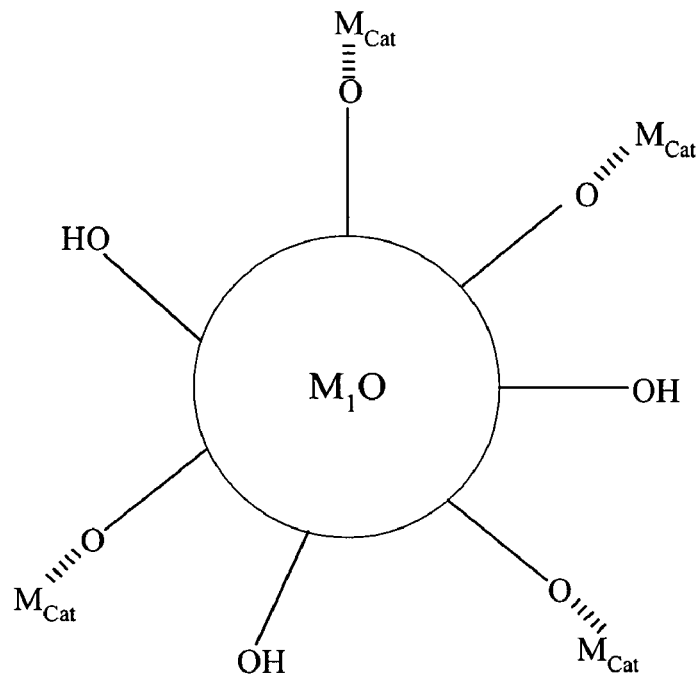
Figure 1D:
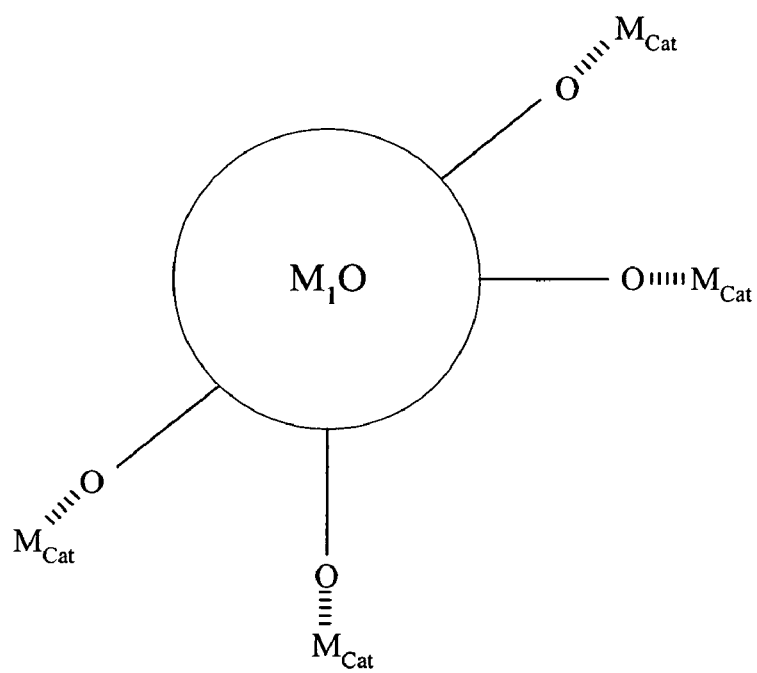
Figure 1E:
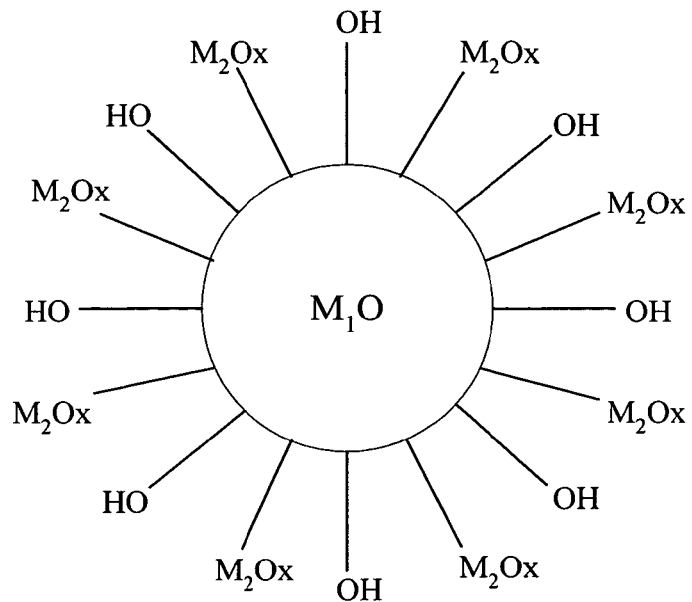
Figure 1F:
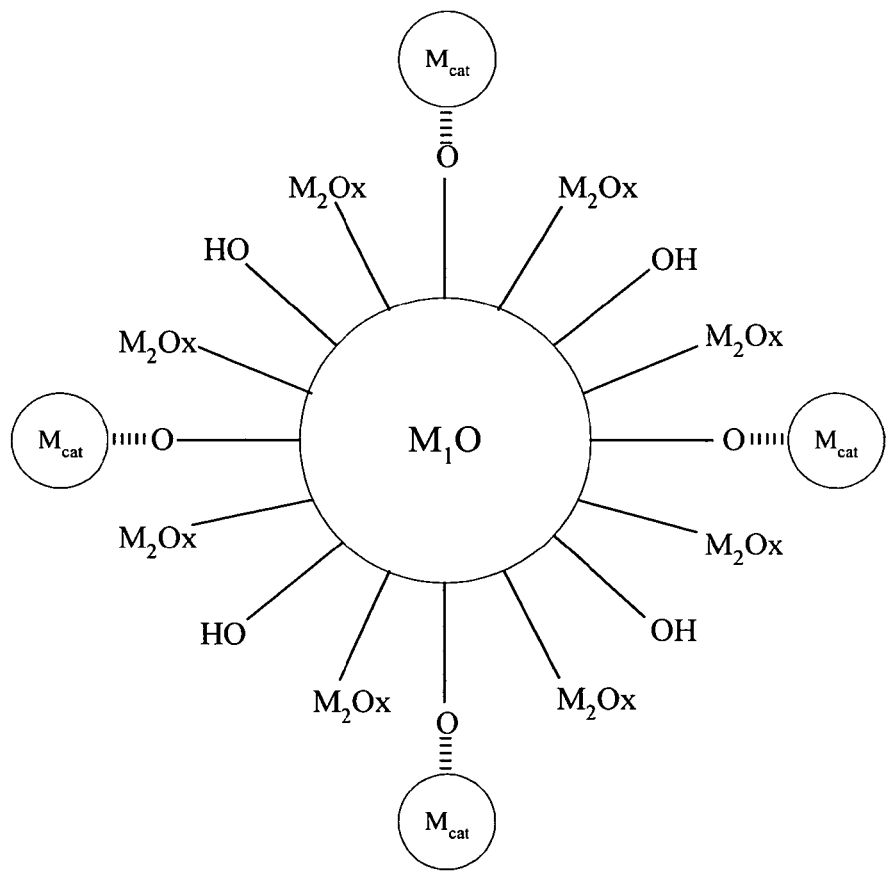
Figure 1G:
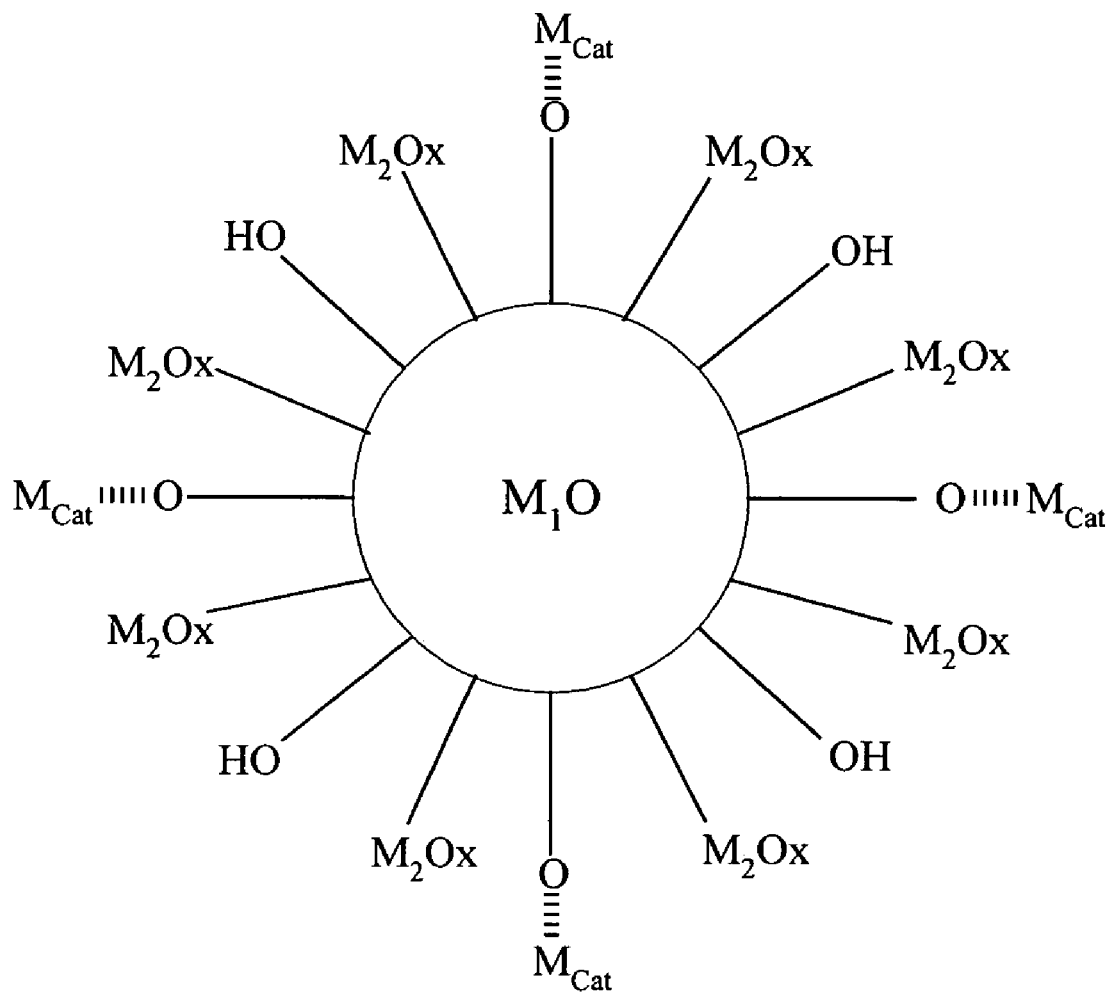

In one embodiment, the catalytic material comprises a first metal oxide and a metal catalyst attached to the surface of the first metal oxide as represented by formula (C) and (D) (See also FIGS. 1C and 1D).

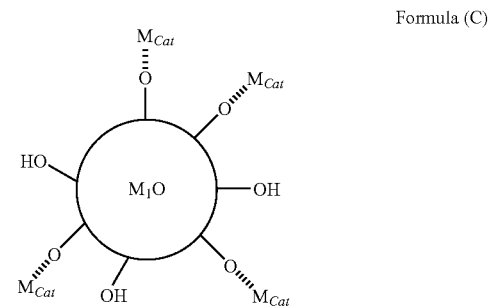

Formula (C)

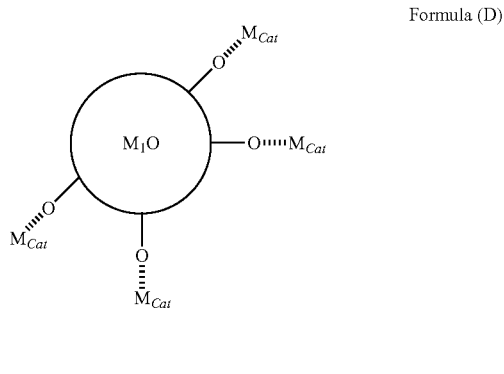

Formula (D)

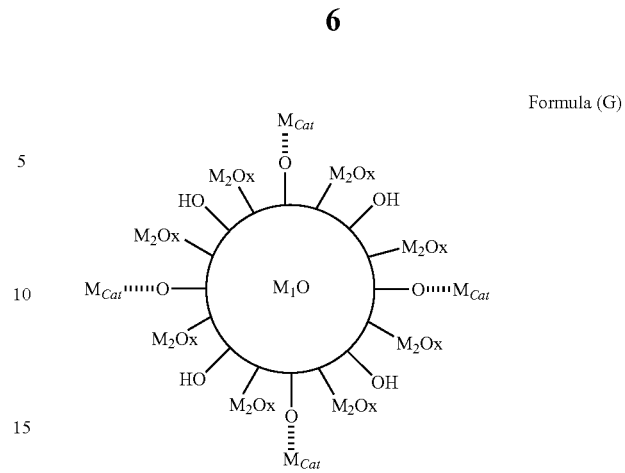

Formula (G)

The metal catalyst becomes anchored to the surface by interacting with the hydroxyl group on the surface of the first meal oxide. The first metal oxide is in crystal form ($M_1O$, see formula (A)) that serves as a support for the metal catalyst. Preferably, the crystal form of the first metal oxide has a size of about 3 to about 25 nm, more preferably, about 6 to about 15 nm. Also preferably, the crystallinity of the first metal oxide is greater than about 50%, or about 60%, or about 70%. Further preferably, the crystal structure of the first metal oxide can be anatase, wherein rutile can comprise about 0 to about 30% by weight. In a preferred embodiment, the first metal oxide is one selected from the group consisting of $TiO_2$, $SiO_2$, $Al_2O_3$, $ZrO_2$, and $WO_3$. In a more preferred embodiment, the first metal oxide is $TiO_2$.

As depicted in formula (C), there are hydroxyl groups attached to the surface of the first metal oxide. The number of hydroxyl groups anchored to the surface of the crystal determines the surface hydration rate of the first metal oxide. Before the deposition of the metal catalyst, it is desirable to have a high surface hydration rate. Preferably, the surface hydration rate is about 0 to about 100 mg per gram of the dry first metal oxide, more preferably about 0 to about 50 mg, or about 0 to about 25 mg per gram of the dry first metal oxide. Since the hydroxyl groups on the surface of the first metal oxide can cause the metal catalyst to sinter on the surface of the first metal oxide, it is desirable to remove the hydroxyl groups from the surface of the first metal oxide after the deposition of the metal catalyst. The hydroxyl groups can be removed by introducing to the surface free radicals to form water and by subsequently heating the catalytic material at low-temperature. Preferably, the heating is conducted between 25° C. to 200° C., more preferably between 30° C. to 150° C.

The metal catalyst normally comprises a transitional metal or the salt thereof. Preferably, the metal in the metal catalyst is one selected from the group consisting of Fe, Co, Ni, Ru, Rh, Pd, Os, Ir, Pt, Au, Ag, and Cu. More preferably, Au or Pt or the mixture thereof is used in the metal catalyst. Preferably, the loading of the metal catalyst on the first metal oxide is preferably in the range of about 0.01 to about 2.5% by weight, more preferably about 0.7 to about 2% by weight.

In another embodiment, the catalytic material comprises a first metal oxide, a second metal oxide, and a metal catalyst as represented by formula (G).

The metal catalyst becomes anchored to the surface by interacting with the hydroxyl group on the surface of the first meal oxide whereas the second metal oxide is directly anchored to the surface of the first metal oxide. The first metal oxide is in crystal form ($M_1O$, see formula (A)) that serves as a support for the metal catalyst. Preferably, the crystal form of the first metal oxide has a size of about 3 to about 25 nm, more preferably, about 6 to about 15 nm. Also preferably, the crystallinity of the first metal oxide is greater than about 70%. Further preferably, the crystal structure of the first metal oxide can be anatase, wherein rutile can comprise about 0 to about 30% by weight. In a preferred embodiment, the first metal oxide is one selected from the group consisting of $TiO_2$, $SiO_2$, $Al_2O_3$, $ZrO_2$, and $WO_3$. In a more preferred embodiment, the first metal oxide is $TiO_2$.

The second metal oxide serves as a blocking agent that blocks the migration of the metal catalyst on the surface of the first metal oxide even in the presence of the hydroxyl groups on the surface of the first metal oxide. Preferably, the second metal oxide is deposited before the metal catalyst is deposited onto the surface of the first metal oxide. More preferably, the second metal oxide is in monomeric or oligomeric form or the mixture thereof. Most preferably, at least about 60% of the second metal oxide is monomeric. The second metal oxide can be selected from any metal oxides that can form monomeric or oligomeric layers. Preferably, vanadium oxide or manganese oxide or chromium oxide or molybdenum oxide is selected as the second metal oxide. The loading of the second metal oxide on the first metal oxide is preferably about 0.25 to about 0.5 Langmuir. i.e., about 25 to about 50% of the first metal oxide surface is covered by the second metal oxide.

As depicted in formula (C), there are hydroxyl groups attached to the surface of the first metal oxide. The number of hydroxyl groups anchored to the surface of the crystal determines the surface hydration rate of the first metal oxide. Before the deposition of the metal catalyst, it is desirable to have a high surface hydration rate. Preferably, the surface hydration rate is about 0 to about 100 mg per gram of the dry first metal oxide, more preferably about 0 to about 50 mg, or about 0 to about 25 mg per gram of the dry first metal oxide. Since the hydroxyl groups on the surface of the first metal oxide can cause the metal catalyst to sinter on the surface of the first metal oxide, it is desirable to remove the hydroxyl groups from the surface of the first metal oxide after the deposition of the metal catalyst. The hydroxyl groups can be removed by introducing to the surface free radicals to form water and by subsequently heating the catalytic material at low-temperature. Preferably, the heating is conducted between 25° C. to 200° C., more preferably between 30° C. to 150° C.

The metal catalyst normally comprises a transitional metal or the salt thereof. Preferably, the metal in the metal catalyst is one selected from the group consisting of Fe, Co, Ni, Ru, Rh, Pd, Os, Ir, Pt, Au, Ag, and Cu. More preferably, Au or Pt or the mixture thereof is used in the metal catalyst. Preferably, the loading of the metal catalyst on the first metal oxide is preferably in the range of about 0.01 to about 2.5% by weight, more preferably about 0.7 to about 2% by weight.

The catalytic material of the present invention is advantageously useful over the prior art for many catalytic reactions. Examples of advantages include but are not limited to high catalytic activity at low temperature, an improved catalytic stability and life due to the anchoring of the metal crystallites, and simply and easy way to regenerate the catalytic material. For example, the catalytic material of the present invention can show more than about 9000 hours of operation without requiring regeneration. In addition, regeneration can be simply achieved by washing and drying in an oven.

Methods of Preparing the Catalytic Material

Another aspect of the present invention provides a method of producing the catalytic material. In general, the method includes preparing a crystallized and nano-sized particles of the first metal oxide, depositing the metal catalyst precursor onto the surface of the first metal oxide, and converting the metal catalyst precursor into metal catalyst. Optionally, excessive hydroxyl groups on the surface of the first metal oxide can be removed after metal catalyst is formed.

In one embodiment, the present invention provides a method for producing a catalytic material comprising: (a) forming amorphous material of the first metal oxide; (b) crystallizing the first metal oxide into nano-sized particles, preferably about 3 to about 16 nm in size; (c) controlling the level of surface hydration of the first metal oxide particles to a range of about 5 to about 100 mg per gram of the dry first metal oxide; (d) depositing a metal catalyst precursor to the first metal oxide; (e) converting the metal catalyst precursor to active metal catalyst; and (f) removing the excessive hydroxyl groups from the surface of the first metal oxide.

Many methods known to one of ordinary skill in the art can be used to make the amorphous metal oxide. For example, the sol-gel method known in the art can be used to form amorphous metal oxide. In particular, the method involves (a) hydrolysis reaction wherein a metal oxide precursor is converted into hydroxyl containing intermediates; (b) condensation reaction wherein the hydrolyzed precursor reacts with one another (releasing a water molecule) to form a polymeric chain. Preferably, the metal oxide precursor is added drop wise into an excessive water alcohol solution for rapid hydrolysis and condensation reactions.

Methods of forming crystallized metal oxide are well known in the art. Preferably, the crystallized metal oxide can be formed by (1) thermal treatment, (2) hydrothermal treatment, and microwave treatment (A. J. Maira, K. L. Yeung, J. Soria, J. M. Coronado, C. Belver, C. Y. Lee, V. Augugliaro, *Appl. Catal. B: Environ*, 29: 327 (2001); A. M. Peiró, J. Peral, C. Domingo, X. Domènech, and J. A. Ayllón, *Chem. Mater.*, 13: 2567 (2001)), all are incorporated by reference in their entirety.

After the crystals are formed, there exist some carbon contaminants (i.e., organic molecules) that can interfere with the deposition of the metal catalyst precursor onto the surface of the crystal. Such contaminants can be removed by methods well known in the art, preferably by low temperature oxidation treatment, more preferably by ozone treatment.

In step (d) above, the metal catalyst precursor can be deposited onto the surface of the crystallized first metal oxide by conventional ways well known in the art. After deposition, the metal catalyst precursor is then converted into active metal catalyst. Precursors to many metal catalysts are well known in the art. For a general review, see R. A. van Santen, P. W. N. M. van Leeuwen, J. A. Moulijn, B. A. Averill, *Catalysis: An Integrated Approach*, second edition, Elsevier (1999). The metal catalyst precursors are generally exist in salts, preferably water soluble salts. Examples of the metal catalyst precursor include but are not limited to nitrate, nitrites, chlorides, acetates, acetylacetonates, hydroxyacetates, or hydroxide salts of the metal catalysts.

After the metal catalyst is deposited on the metal oxide crystals, it tends to migrate around the surface via the readily available free-hydroxyl groups. Such movement will eventually lead to sintering and thus should be prevented. Therefore, it is desirable to remove excessive free hydroxyl groups on the metal oxide crystal surface after metal catalyst is deposited thereon. Ideally, all the surface hydration should be removed because any trace water on the surface will become free hydroxyl groups as time goes by. In one embodiment, the free-hydroxyl groups are transformed to water by reacting with free radicals. The water is then evaporated by low-temperature heating, preferably between 25° C. to 200° C., more preferably between 30° C. to 150° C. Preferably, the free radicals are introduced by ozone treatment or UV radiation.

In an alternative embodiment, the present invention provides another method of producing a catalytic material comprising: (a) forming amorphous material of the first metal oxide; (b) crystallizing the first metal oxide into nano-sized particles, preferably about 3 to about 16 nm in size; (c) controlling the level of surface hydration of the first metal oxide particles to a range of about 5 to about 100 mg per gram of the dry first metal oxide; (d) depositing a monomeric or oligomeric or the mixture thereof second metal oxide to the surface of the first metal oxide; (e) depositing a metal catalyst precursor to the first metal oxide; (f) converting the metal catalyst precursor to active metal catalyst; and (g) removing the excessive hydroxyl groups from the surface of the first metal oxide.

The main objective of adding a second metal oxide is to prevent the migration of deposited metals that led to formation of larger metal particles. The metal oxides can also directly or indirectly modify the electronic and catalytic properties of the first metal oxide or the metal catalysts.

The second metal oxide can be selected from any metal oxides that can form monomeric or oligomeric layers. Preferably, vanadium oxide manganese oxide or chromium oxide or molybdenum oxide is selected as the second metal oxide. The loading of the second metal oxide on the first metal oxide is preferably about 0.25 to about 0.5 Langmuir. i.e., about 25 to about 50% of the first metal oxide surface is covered by the second metal oxide.

Once the second metal oxide (blocking agent) is added to the first metal oxide support, the metal catalyst can be deposited onto the first metal oxide support with methods as described above. There are many ways to characterize the formed metal catalyst/catalytic material (See Table 4 for a nonlimiting examples of methods.).

Use of the Catalytic Material

The catalytic material of the present invention are active in a great variety of reactions. In particular, the catalytic material can be used to oxidize CO or hydrocarbons. In addition, the catalytic material of the present invention can also be used to destroy microorganisms such as bacteria or fungi. Thereby, the catalytic material of the present invention is useful in purifying the air by removing from the air the contaminants containing toxic organic, inorganic, and/or biological species. The term "organic, inorganic, or biological species" as used herein refers to organic and/or inorganic particles, bacteria, and/or viruses, and which cause harm, illness, and/or death in humans. Examples of well-known toxic agents that are of concern include but are not limited to, sarin, mustard gas (bis(2-chloroethyl) thioether), phosgene, cyanogen chloride, ammonia, ethylene oxide, carbon mono-oxide, anthrax, E. coli, salmonella, hepatitis, listeria, legionella, and Norwalk virus, etc. In one embodiment, the catalytic material of the present invention is contacted with a sample (such as an airflow) and reduction in the level of contaminants are detected. For non-limiting examples of removing contaminants, see Examples 12-14.

EXAMPLES

Example 1

The Catalytic Intermediates and Final Products

Referring to FIG. 1, compound (A) is a first metal oxide crystal ($M_1O$) serving as the catalyst support. The size of (A) is about 3 to about 25 nm, preferably, the size is about 3 to about 16 nm and, more preferably, about 6 to about 15 nm. Preferably, the crystallinity of (A) is better than about 70% and the crystal structure of (A) can be primarily anatase. Up to about 30% rutile can be tolerated.

Compound (B) comprises a metal precursor, depicted as $_{cat}$ in FIG. 1, deposited on compound (A). Preferably, the metal precursor is adsorbed to a portion of the hydroxyl groups on compound (A). Preferably, the loading of the metal precursor is in the range of about 0.01 to about 2.5 wt. %.

Compound (C) comprises active metal catalysts $M_{cat}$ which is converted from the metal precursors of compound (B). Preferably, the metal catalyst is adsorbed to a portion of the hydroxyl groups on compound (A). The loading of the metal catalyst is preferably in the range of about 0.01 to about 2.5 wt. %.

The composition of compound (D) is similar to that of compound (C), except that the un-adsorbed hydroxyl groups are limited to about 0 to about 3 mg/g. Such low amount of free hydroxyl groups can prevent metal catalyst from sintering.

Compound (E) comprises a second metal oxide ($M_2O_x$) deposited on the surface of compound (A). Compound (F) is similar to compound (E), except that a metal precursor is adsorbed to some of the hydroxyl groups on (E). Compound (G) is similar to compound (F), except that the metal precursor is converted into active metal catalyst.

Example 2

Schematic Process of Producing the Catalytic Material

Figure 2:
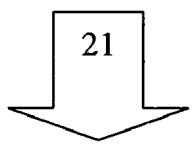
FIG. 2 is a schematic diagram illustrating the steps of making catalysts in accordance with the current invention. Compounds (A) to (G) are as shown in FIGS. 1A-G.
Figure 2:
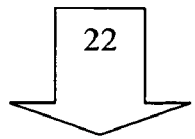
Figure 2:
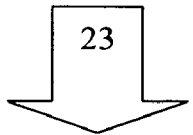
Figure 2:
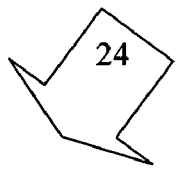
Figure 2:
Figure 2:
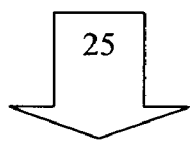
Figure 2:
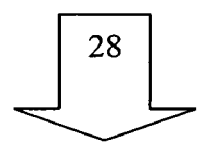
Figure 2:
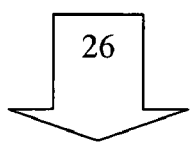
Figure 2:
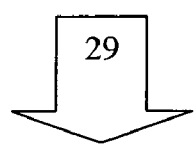

FIG. 2 summarizes the process of making the invented metal catalyst in accordance with the preferred embodiments of the current invention. The first step 21 is to form an amorphous first metal oxide gel sphere. In step 22, the gel sphere is crystallized in a tightly controlled condition such that the first metal oxide crystals are formed with surface hydration optimized for metal deposition. Step 23 comprises cleaning the contaminants on the first metal oxide surface and adjusting surface hydration level to about 5 to about 100 mg/g dry solid, forming compound (A). Step 24 comprises depositing a metal precursor onto (A), forming compound (B). Step 25 comprises converting the metal precursor on compound (B) into active metal catalyst, forming compound (C). Step 26 comprises removing excess hydration on compound (C), forming compound (D), such that the metal catalyst does not migrate on the surface of first metal oxide support.

An alternative step 27 can be employed after (A) is formed, which comprises depositing a second metal oxide onto the surface of compound (A), forming compound (E). A metal precursor is further deposited onto compound (E) in step 28, forming compound (F). In step 29, the metal precursor on compound (F) is converted into active metal catalyst, forming compound (G). In this particular embodiment, it is possible to skip the step of removing excess hydration after step 29.

Example 3

Forming ($TiO_x(OH)_y$) (Corresponding to Step 21)

Preferably, in $TiO_x(OH)_y$, x is an integer from 0 to 2, and y is an integer with the value of 4−2x. More preferably, $TiO_x(OH)_y$ comprises $Ti(OH)_4$, $TiO(OH)_2$, $TiO_2$ species or mixtures thereof.

Procedure:
(1) Titanium isopropoxide (TIP, Aldrich) was dissolved in isopropanol at room temperature to give a solution containing about 0.1 to about 20 mM TIP.
(2) TIP-isopropanol solution was added drop by drop into a water-isopropanol solution (containing about 0.01 to about 2.5 M water) with constant stirring at a fixed temperature between 25-80° C.
(3) The resulting precipitates were filtered, washed, and dried at room temperature for later use.

Example 4

Forming $TiO_2$ Crystals (Corresponding to Step 22)

Three different methods were described here to form $TiO_2$ crystals, namely, thermal treatment, hydrothermal treatment, and microwave treatment.

1. Thermal Treatment

Procedure:
(1) Amorphous $TiO_2$ powder obtained from Example 1 was spread in a thin layer on a crucible.
(2) The sample is placed in a preheated oven, the treatment temperature and time were selected depending on the crystal size needed. Some suggested conditions are listed in Table 1 (i.e. P11S100, P27S100).
(3) The air calcined sample was removed from the oven and quenched to room temperature Thermal treatment produces $TiO_2$ crystals with excellent crystallinity (>about 80% versus commercial Anatase $TiO_2$ (Aldrich Chemicals) with low surface hydration. Although the technique could be used to prepare crystals smaller than about 10 nm, the resulted crystals often consist of a broad range of particle sizes.

TABLE 1

Example preparation methodology

| Sample | Particle size Primary** | Particle size Secondary† | Preparation conditions |
|---|---|---|---|
| P02S100 | 2.3 nm | 100 nm | 17 ml $H_2O$ + 8 ml isopropanol/100° C. for 8 hours |
| P04S100 | 3.8 nm | 100 nm | 15 ml $H_2O$ + 10 ml isopropanol/100° C. for 8 hours |
| P05S100 | 5.2 nm | 100 nm | 15 ml $H_2O$ + 10 ml isopropanol/150° C. for 8 hours |
| P07S100 | 7.0 nm | 100 nm | 10 ml $H_2O$ + 15 ml isopropanol/150° C. for 8 hours |
| P08S100 | 8.5 nm | 100 nm | 2.5 ml $H_2O$ + 2.5 ml isopropanol/150° C. for 8 hours |
| P11S100 | 11 nm | 100 nm | Air. 450° C. for 3 hours |
| P27S100 | 27 nm | 100 nm | Air. 700° C. for 15 min |

**crystal size measured from XRD line broadening
†aggregate or cluster size determined by TEM analysis 2. Hydrothermal Treatment Procedure:

(1) Amorphous $TiO_2$ powder was dispersed in an organic-water solution. Isopropanol-water was selected to avoid foreign contamination.

(2) The hydrothermal treatment was conducted in a 150 ml, Teflon-lined autoclave vessel (PTFE-4748, Parr Scientific).

(3) The vessel was placed in a pre-heated oven for a preset time to obtain the desired crystal size as shown in Table 1 (P02S100, P04S100, P05S100, P07S100 and P08S100).

The hydrothermal treatment produces $TiO_2$ crystals with high level of surface hydration. This is a precise method for preparing samples with narrow size distribution.

Note: the composition of the mixture, temperature and time affects the crystallization rate. Crystallization is slow in solution with high water concentration but fast at high temperature.

3. Microwave Treatment

A. Procedure of Microwave Treatment of Titanium Dioxide Sol (Microwave Sol-gel Method):

(1) 1M of titanium isopropoxide (98%, ACROS) and isopropanol solution (99%, BDH) was slowly added to distilled, deionized water under vigorous stirring. The amount of water that can be used in this step is determined by the concentration of the final solution.

(2) The resulting solution was stirred for about 1 hour to ensure complete hydrolysis of titanium isopropoxide.

(3) A desired amount of nitric acid (about 1.0M, $[H^+]/[Ti^{4+}]$ =about 0.4)) was then added for peptizing.

(4) The temperature was increased gradually to 70° C. and then maintained for 2 h to evaporate the isopropanol.

(5) Subsequently, it was stirred at room temperature to form a $TiO_2$ sol (about 0.28M).

(6) A desired amount of $TiO_2$ sol was placed into the Teflon lined digestion vessel and heated in the microwave oven (MLS-1200 MEGA, MILESTONE) working at different power settings (i.e. 50 W, 70 W, 90 W, 120 W, 250 W).

(7) The duration of treatment time was set as 20 min for all the synthesis processes.

(8) The obtained $TiO_2$ samples were dried in the vacuum box until the formation of gel sample and then calcined at different temperature to produce the anatase $TiO_2$.

Microwave treatment produces $TiO_2$ crystals with high level of surface hydration. Crystal size control is less precise compared to hydrothermal crystallization but the time is significantly shortened from hours to minutes.

B. Procedure of Microwave Treatment of Polyethylene Glycol (PEG) Modified Titanium Dioxide Sol (PEG Assisted Microwave Method): (The Addition of PEG is to Prevent Particle Agglomeration.)

(1) The polyethylene glycol (PEG) with average molecular weight of 400 (ACROS) was chosen as the modified polymer.

(2) The amount of PEG 400 (about 5 wt. %) was added directly to the original $TiO_2$ sol solution (Procedure A above, item 5) and stirred for 5 h to obtain the modified solution.

(3) A desired amount of modified $TiO_2$ sol was placed into the Teflon lined digestion vessel and heated in the microwave oven working at power of 90 W and 120 W, respectively, for 20 min.

(4) The obtained $TiO_2$ samples were dried in the vacuum box and then calcined at 450° C. for 5 h to obtain the powder samples.

Example 5

Surface Modification: Removing Contaminants (Corresponding to Step 23)

After the $TiO_2$ crystals are produced, there may be some unwanted carbon contaminants (e.g., organic molecules) that can interfere with the deposition of metal precursor onto the $TiO_2$. Such contaminants can be removed by low temperature oxidation treatment. In the embodiment described in this example, ozone treatment is employed.

Procedure:

(1) $TiO_2$ powder was placed in a flow cell made of quartz, (2) 100 sccm of 100 $g/m^3$ ozone in oxygen was feed to the flow cell, (3) The flow cell was heated to 200° C. and the $TiO_2$ powder was treated for 1 h.

In addition to removing contaminants, ozone treatment can also be employed to remove excess hydration on the $TiO_2$ surface.

Example 6

Depositing Metal Catalyst (Corresponding to Step 24 and Step 25)

A. Procedure of Preparing $Au/TiO_2$:

1. 1 g of $TiO_2$ powder was placed in a 250 ml round bottom flask.
2. The flask was wrapped with the aluminum foil.
3. 100 ml of double distilled, de-ionized water was added to the flask.
4. The $TiO_2$ suspension was stirred for 5 min.
5. 20 ml of 2.5 mM hydrogen tetrachloroaurate (III) trihydrate, $HAuCl_4$ was added.
6. The mixture was stirred at room temperature for 30 min.
7. The powder was collected by centrifugation at 3500 rpm for 15 min.
8. The powder was washed with ~95° C. hot water three times to remove the chlorine.
9. The powder was dried in a 120° C. oven for 24 hours.

10. The Au/TiO$_2$ powder was treated with ozone in quartz tube at 200° C. in flowing 100 g/m$^3$ O$_3$ for 5 hours.

B. Procedure of Preparing Pt/TiO$_2$:
1. 1 g of ozone treated TiO$_2$ powder was placed in a 250 ml round bottom flask.
2. The flask was wrapped with the aluminum foil.
3. 100 ml of double distilled, de-ionized water was added to the flask.
4. The TiO$_2$ suspension was stirred for 5 min.
5. 20 ml of 2.5 mM hydrogen hexachlorolatinate (IV) (H$_2$PtCl$_6$.5H$_2$O) was added.
6. The mixture was stirred at room temperature for 30 min.
7. The powder was collected by centrifugation at 3500 rpm for 15 min.
8. The powder was washed with ~95° C. hot water three times to remove the chlorine.
9. The powder was dried in a 120° C. oven for 24 hours.
10. The Pt/TiO$_2$ powder was treated with ozone in quartz tube at 200° C. in flowing 100 g/m$^3$ O$_3$ for 5 hours.

Example 7

Adjusting the Hydration Level on TiO$_2$ Surface (Corresponding to Step 26)

A. Procedure of Ozone Treatment:
1. TiO$_2$ powder was placed in a flow cell made of quartz.
2. 100 sccm of 100 g/m$^3$ ozone in oxygen was feed to the flow cell.
3. The flow cell was heated to 200° C. and the TiO$_2$ powder was treated for 1 to 5 h.

The process was monitored in-situ using Fourier Transform Infrared Spectroscopy (see General Characterization Methods described in a later section).

B. Procedure of UV Radiation:
1. TiO$_2$ powder was placed in a flow cell made of UV-transparent quartz.
2. Dry air was feed to the flow cell.
3. The TiO$_2$ powder was irradiated with UV-black lamp, which resulted in the outgassing of adsorbed water and removal of surface hydroxyl groups.

The process was monitored in-situ using Fourier Transform Infrared Spectroscopy (see General Characterization Methods).

Example 8

Adding a Blocking Agent Before Metal Deposition (Corresponding to Step 27)

Procedure:
1. TiO$_2$ powder was impregnated with an aqueous NH$_4$VO$_3$ (Sigma) solution.
2. The volume of liquid needed was determined by titrating a know weight of TiO$_2$ sample with water until a thin layer film is formed on the powder.
3. The concentration was based on the amount of vanadium precursor that will provide about 0.25 or 0.5 monolayer of vanadium oxide surface coverage.
4. The mixture was heated and stirred at 80° C. for 50 min.
5. The excess water was removed in a rotary evaporator at 80° C.
6. The resulting solid was heat treated in air at 200° C. for 4 hours.

One monolayer was around 8-9 atoms per nm$^2$ of TiO$_2$. Monomeric vanadium oxide has a distinct peak in Raman spectroscopy and temperature programmed reduction.

Example 9

Depositing Metal After Blocking Agent is Added (Corresponding to Step 28 and 29)

Procedure of Preparing Au/Vanadium Oxide-TiO$_2$:
(1) 1 g Vanadium oxide-TiO$_2$ (monomeric) was placed in a flow cell made of quartz
(2) 100 sccm of 100 g/m$^3$ ozone in oxygen was fed to the flow cell
(3) The flow cell was heated to 200° C. and the TiO$_2$ powder was treated for 1 to 5 h.
(4) 1 g of ozone treated Vanadium oxide-TiO$_2$ (monomeric) was placed in a 250 ml round bottom flask.
(5) The flask was wrapped with the aluminum foil.
(6) 100 ml of double distilled, de-ionized water were added to the flask.
(7) The TiO$_2$ suspension was stirred for 5 min.
(8) 20 ml of 2.5 mM hydrogen tetrachloroaurate (III) trihydrate, HAuCl$_4$ was added.
(9) The mixture was stirred at room temperature for 30 min.
(10) The powder was collected by centrifugation at 3500 rpm for 15 mins.
(11) The powder was washed with ~95° C. hot water three times to remove the chlorine.
(12) The powder was dried in a 120° C. oven for 24 hours.
(13) The Au/TiO$_2$ powder was treated with ozone in quartz tube at 200° C. in flowing 100 g/m$^3$ O$_3$ for 5 hours.

From the X-ray photoelectron spectroscopy, the surface atomic concentration ratio of VO$_x$/TiO$_2$ was about 0.2028, and the ratio of VO$_x$/TiO$_2$ in Au/VO$_x$/TiO$_2$ was about 0.1195. From the inductively coupled plasma spectroscopy, the mass ratio of vanadium in VO$_x$/TiO$_2$ was about 4.37 wt %. The mass ratio of gold in Au/VO$_x$/TiO$_2$ was about 0.041 wt. %.

Example 10

Methods of Characterizing the Catalyst

Table 4 illustrates the methods used in characterizing the supported metal catalyst prepared in the present invention and the details are described thereafter.

TABLE 4

| No. | Property | Characterization Method |
|---|---|---|
| 1 | Crystal structure and size of TiO$_2$ | X-ray diffraction analysis, Micro-Raman analysis, and transmission electron microsopy (TEM) |
| 2 | Crystallinity of TiO$_2$ | X-ray absorption analysis (Synchrotron Radiation Research Center in Taiwan) and electron paramagnetic resonance spectroscopy |
| 3 | Surface hydration of TiO$_2$ | Fourier transform infrared (FTIR) spectroscopy and thermogravimetric and differential thermal Analyses |
| 4 | Deposited VOx | Micro-Raman analysis and temperature programmed reduction |
| 5 | Metal loading and dispersion on TiO$_2$ | Acid digestion and inductively coupled plasma with atomic emission spectroscopy, Chemisorption and TEM |
| 6 | BET Surface Area | Nitrogen physisorption |

TABLE 4-continued

| No. | Property | Characterization Method |
|---|---|---|
| 7 | Surface composition | X-ray photoelectron spectroscopy |
| 8 | Nanoparticle size and morphology | Atomic force microscopy |

1. Crystal Structure and Size of $TiO_2$ (1) X-ray Diffraction Analysis (Philips 1080)

1. The catalyst powder was ground and shifted to produce a fine powder.
2. The powder was placed in an aluminum holder and placed in the sample holder of X-ray diffractometer.
3. A CuKα X-ray source was used and the X-ray diffraction was recorded for 20°<2θ<60° by step-scanning at 0.05° increments.

(2) X-ray Diffraction Analysis (Synchrotron Radiation Research Center (SRRC) in Taiwan)

1. To eliminate the effects of sample thickness the $TiO_2$ powder was rubbed uniformly onto a Scotch tape and folded to get the desired thickness that satisfies Δμx≦1, where Δμx is the edge step.
2. X-ray diffraction analysis of the $TiO_2$ powder was conducted on beamline BL17A at the Synchrotron Radiation Research Center (SRRC) in Taiwan. The X-ray radiation (λ=1.3271 Å) with a beam current of 120-200 mA was supplied from a 1.5 GeV storage ring. The XRD patterns were recorded for 20°<2θ<60° by step-scanning at 0.05° increments.
3. The crystal size was calculated from the peak broadening using Bragg diffraction equation.

Figure 3A:
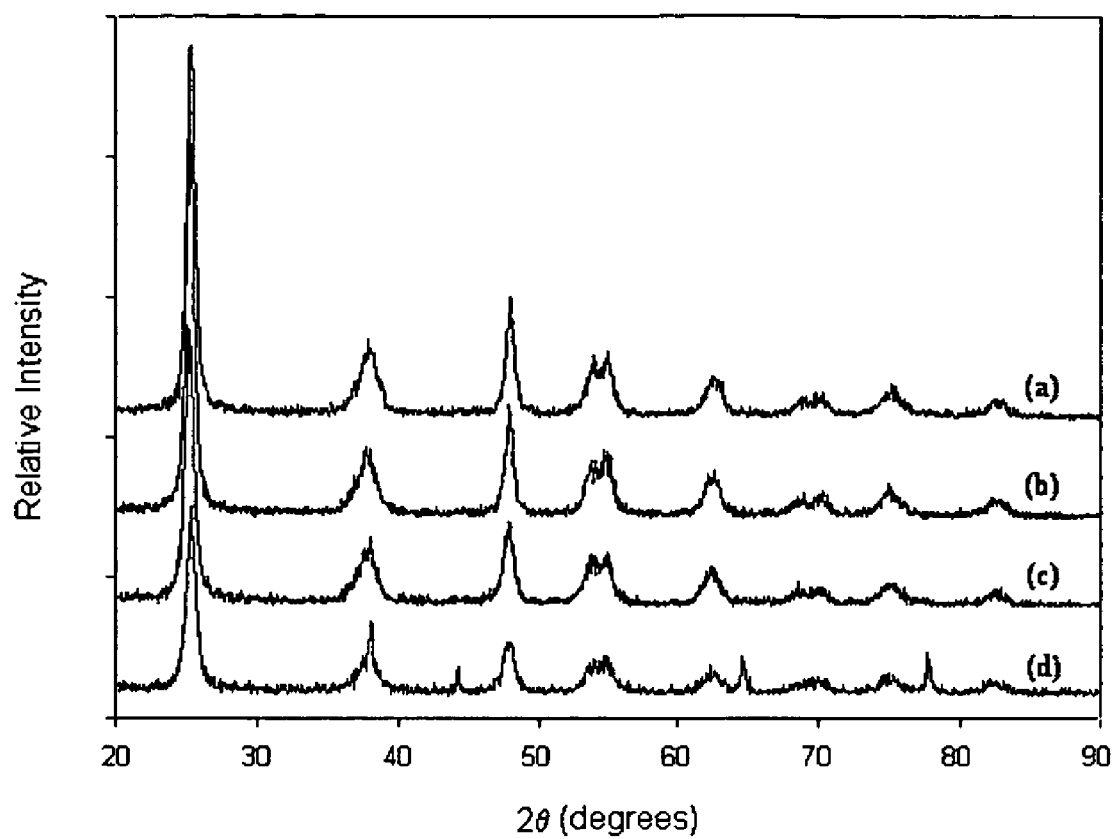
FIG. 3A shows the X-Ray Diffraction patterns (XRD) of catalysts coated to the pure anatase $TiO_2$ crystals (a) Au1T, (b) Pt1T, (c) Au1H and (d) Pt1H.
Figure 3B:
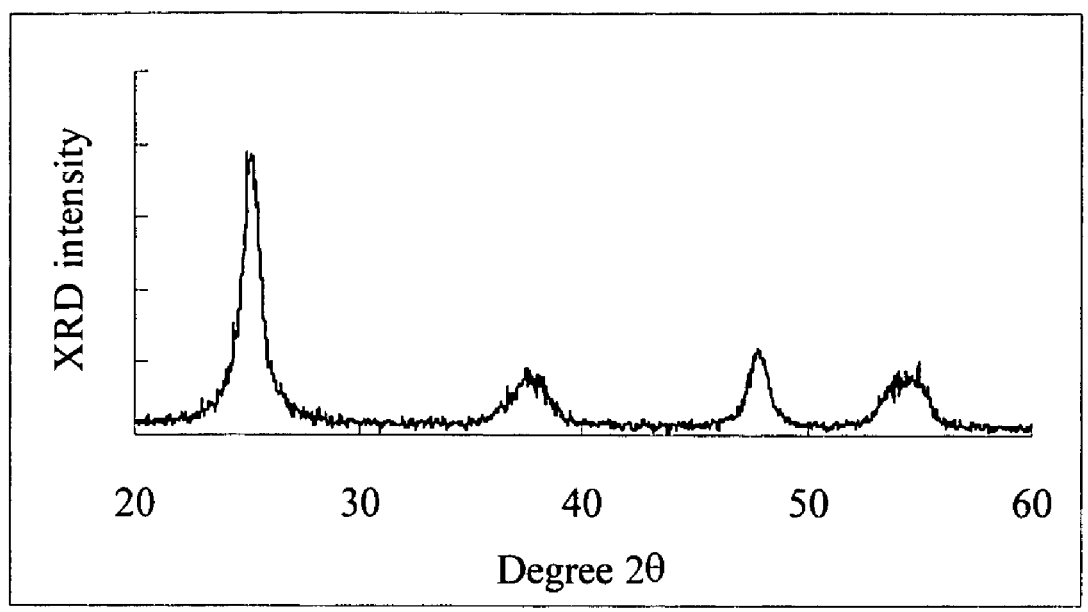
FIG. 3B shows the X-Ray Diffraction pattern (XRD) of pure anatase nanostructured $TiO_2$ crystals.

FIG. 3B shows the XRD pattern of pure nanostructured anatase $TiO_2$. FIG. 3A shows the XRD patterns of catalysts Au1T, Pt1T, Au1H and Pt1H (please refer to table 9 for the meaning of these expressions). A sharp diffraction peak is observed at around 2θ=25.3°, 37.8°, 48°, 55° are characteristic of anatase $TiO_2$ structure (Table 3). The similarity of the patterns between the one in FIG. 3A and FIG. 3B confirm the existence of pure anatase phase in the invented catalysts.

TABLE 3

X-ray diffraction data of pure anatase (Cu Kα radiation source, wavelength: 1.54056 Å) (Cited from 1998 JCPDS-International Centre for Diffraction Data

| 2θ | d (Å) | Intensity | (hkl) |
|---|---|---|---|
| 25.281 | 3.52 | 100 | 101 |
| 36.946 | 2.431 | 10 | 103 |
| 37.80 | 2.378 | 20 | 004 |
| 38.575 | 2.332 | 10 | 112 |
| 48.049 | 1.892 | 35 | 200 |
| 53.890 | 1.6999 | 20 | 105 |
| 55.060 | 1.6665 | 20 | 211 |
| 62.119 | 1.4930 | 4 | 213 |
| 62.688 | 1.4808 | 14 | 204 |

TABLE 4

X-ray diffraction data of pure Rutile (Cu Kα radiation source, wavelength: 1.54056 Å) (Cited from 1998 Joint Committee on Powder Diffraction Standards-International Centre for Diffraction Data)

| 2θ | d (Å) | Intensity | (hkl) |
|---|---|---|---|
| 27.446 | 3.247 | 100 | 110 |
| 36.085 | 2.487 | 50 | 101 |
| 39.187 | 2.297 | 8 | 200 |
| 41.225 | 2.188 | 25 | 111 |
| 44.050 | 2.054 | 10 | 210 |
| 54.322 | 1.6874 | 60 | 211 |
| 56.640 | 1.6237 | 20 | 220 |
| 62.740 | 1.4797 | 10 | 002 |
| 64.038 | 1.4528 | 10 | 310 |

(3) Micro-Raman Analysis

1. The $TiO_2$ powder was placed on a glass microscope slide. The spectral resolution was set at approximately at 1.0 $cm^{-1}$ and the spot size was about two micrometers in diameter.
2. The Raman spectra of the $TiO_2$ sample were measured using a Renishaw 3000 micro-Raman system with an Olympus BH-2 microscope. The objective lenses with 20× and 50× magnifications were selected. The excitation source used was an Argon laser operating at 514.5 nm with an output power of 25 mW.
3. The crystal size was measured from Raman line broadening as described by Iida and coworkers (Y. Iida, M. Furukawa, T. Aoki, T. Sakai, *Appl. Spectrosc.* 1998, 52, 673).

Figure 4:
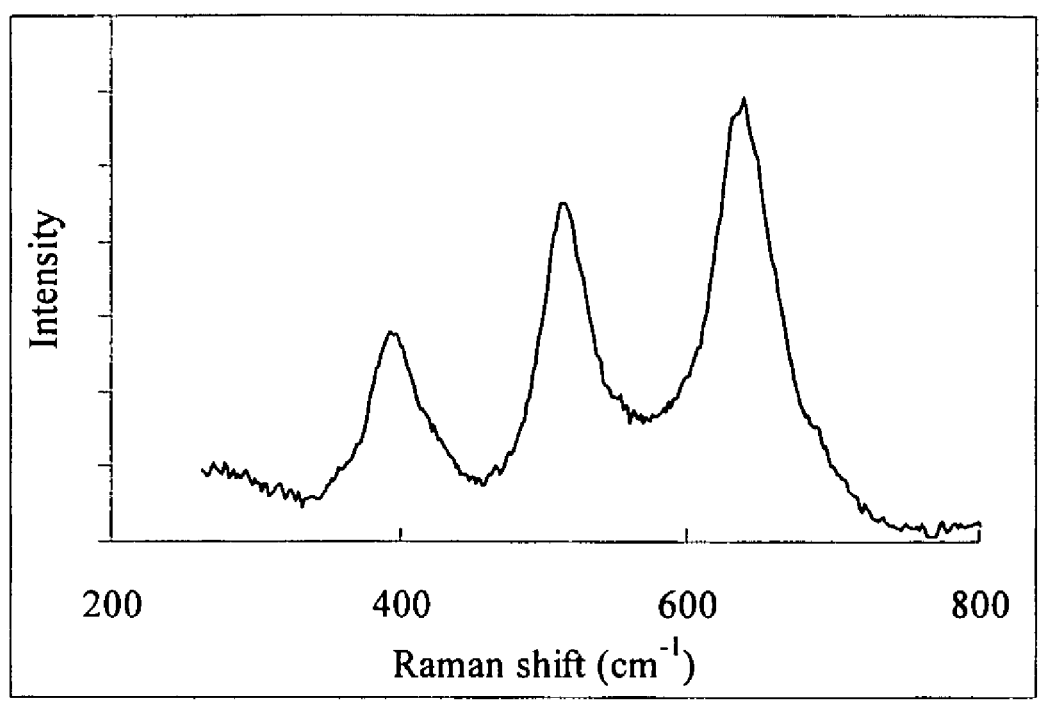
FIG. 4 shows the Raman spectra of nanostructured, Anatase $TiO_2$.

FIG. 4 shows the Raman spectra of nanostructured, anatase $TiO_2$. The characteristic peaks of pure anatase are located at 395, 511, 634, 795 $cm^{-1}$ and the characteristic peaks of rutile are located at 446 and 611 $cm^{-1}$, respectively.

(4) Electron Microscopy

1. The $TiO_2$ powder was dispersed in isopropanol and placed onto a carbon-coated copper grid. The excess liquid was removed using a paper wick and the deposit dried in air prior to imaging.
2. The $TiO_2$ was imaged using a Philips CM-20 transmission electron microscope at an accelerating voltage of 200 kV. Routine energy dispersive X-ray spectroscopy (Link Pentafet detector, Link ISIS software, OXFORD Instruments) was conducted to confirm the chemical composition of the imaged particles.
3. The individual crystals in the aggregates were measured and the average of 400 measurements was used to calculate the average crystal size.

TABLE 5

Structural properties of nanostructured $TiO_2$ prepared by modified sol-gel method.

| Titania Catalysts | Primarily Particle Size (nm)[1] | Secondary Particle Size (nm)[2] | Crystallinity[3] | BET Surface Area[4] ($m^2/g$) |
|---|---|---|---|---|
| P3 | 2.9 | 100 | — | 330 |
| P5a | 4.6 | 100 | $1.0^{a,b}$ | 275 |
| P5b | 5.0 | 100 | $0.8^a$ | 240 |

TABLE 5-continued

Structural properties of nanostructured $TiO_2$ prepared by modified sol-gel method.

| Titania Catalysts | Primarily Particle Size (nm)[1] | Secondary Particle Size (nm)[2] | Crystallinity[3] | BET Surface Area[4] (m²/g) |
|---|---|---|---|---|
| P5c | 5.1 | 100 | 0.5[a] | 220 |
| P6b | 5.7 | 100 | 1.0[b] | 175 |

[1] the crystal size was calculated from XRD line broadening and confirmed by micro-Raman and TEM analyses.
[2] the average aggregate size was obtained from 50 direct measurements of $TiO_2$ clusters imaged by TEM.
[3] the crystallinity was based on the intensity of the anatase (101) XRD peak, i.e., crystallinity = $I/I_0{}^a$, using P5a as the reference[b].
[4] the BET surface area is determined by nitrogen physisorption.

2. Crystallinity of $TiO_2$ (1) X-ray Absorption Analyses
1. To eliminate the effects of sample thickness the $TiO_2$ powder was rubbed uniformly onto a Scotch tape and folded to get the desired thickness that satisfies $\Delta\mu x \leq 1$, where $\Delta\mu x$ is the edge step,
2. X-ray diffraction analysis of the $TiO_2$ powder was conducted on beamline BL17A at the Synchrotron Radiation Research Center (SRRC) in Taiwan. The X-ray radiation ($\lambda$=1.3271 Å) with a beam current of 120-200 mA was supplied from a 1.5 GeV storage ring. The X-ray absorption spectra of the $TiO_2$ samples were measured in transmission mode at room temperature.
3. The spectra were collected using a gas ionization detector. The ion chambers used for measuring the incident ($I_0$) and transmitted (I) synchrotron beam intensities were filled with a He/$N_2$ gas mixture and $N_2$ gas, respectively.
4. Data were collected from 200 eV below the Ti K-edge (4966 eV) to 1100 eV above the edge. Standard titanium metal foil and commercial anatase $TiO_2$ were used as reference standards. Information on the bond structure (i.e., bond lengths, numbers and types of neighboring atoms) could be obtained from the X-ray absorption data.
5. The normalized Ti K-edge X-ray absorption near edge spectra (XANES) provides information on the local environment and structure of $TiO_2$ and can be used to quantify the relative amounts of crystalline and amorphous phase.

Figure 5:
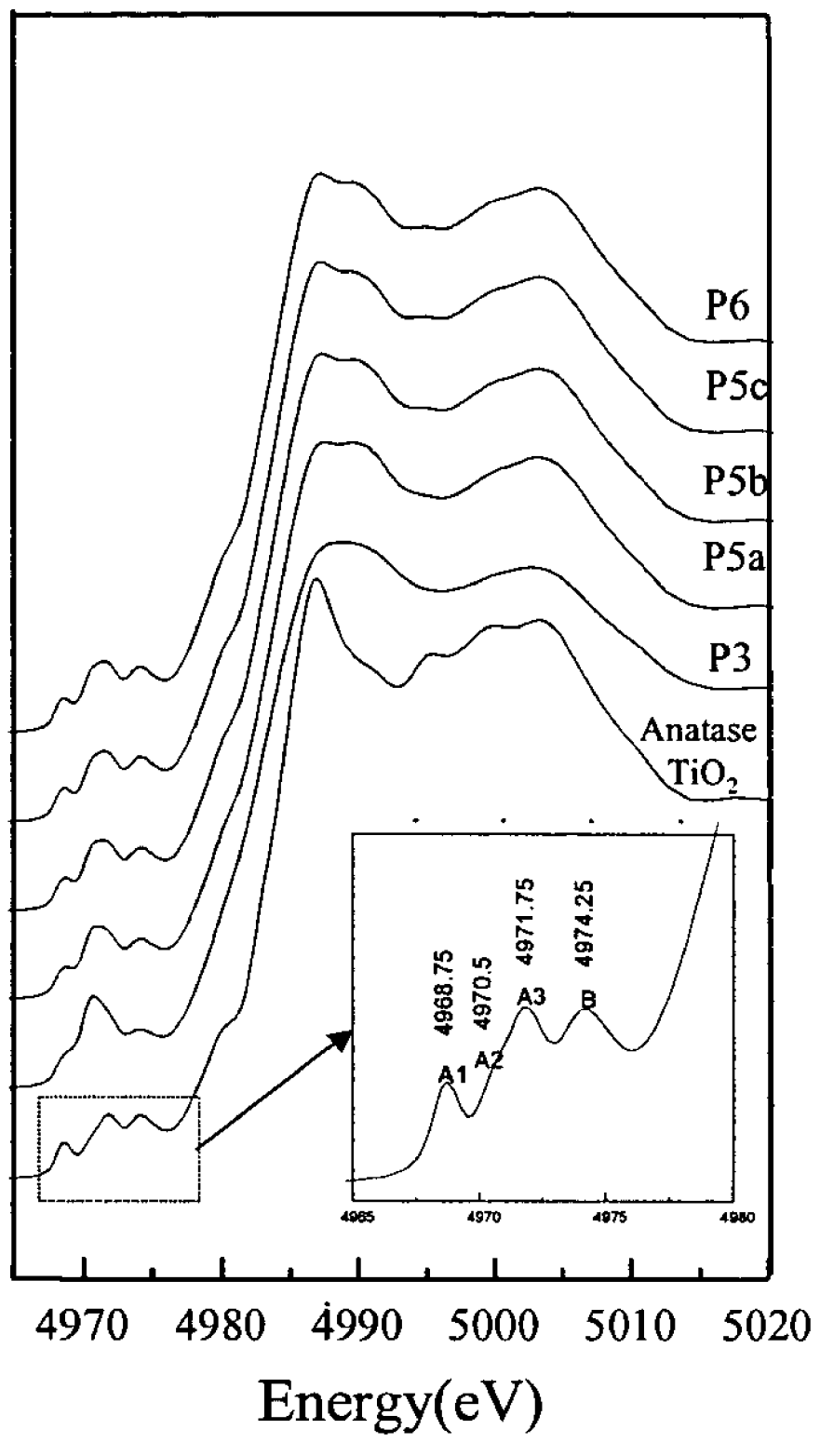
FIG. 5 shows the X-ray absorption near edge structure (XANES) spectra of nanostructured $TiO_2$ obtained at Synchrotron Radiation Research Center (SRRC) in Taiwan.

FIG. 5 is the XANES spectra of nanostructured $TiO_2$ obtained at SRRC in Taiwan. The 4-, 5-, 6-fold coordinated Ti can be identified according to the position and intensity of the pre-edge peaks, which are located at 4969.5 (A1), 4970.5 (A2) and 4971.5 (A3) eV, respectively. As the $TiO_2$ crystal size decreases, the interfacial region comprising of titanium atoms with low coordination number increases. Thus, the titanium atoms in smaller crystals will exhibit lower coordination numbers. Indeed, the 3 nm $TiO_2$ (P3) has the most intense A2 peak (4970.75 eV) that is consistent with 5-fold coordinated Ti. Similar structural geometry has been reported for 1.9 nm $TiO_2$. Larger crystals, which have smaller interfacial area, exhibit a weaker A2 peak but a more intense A3 peak (4971.75 eV) that corresponds to 6-fold coordinated Ti.

(2) Electron Paramagnetic Resonance Spectroscopy
1. About 12 to about 30 mg $TiO_2$ powder was placed in a quartz tube and outgassed in vacuum (T=25° C., t=1 h).
2. The EPR measurements were carried The EPR measurements were carried out in Bruker ER200D instrument operating in the X-band. All the spectra were recorded at 77 K in a T type double cavity.
3. The frequency of the microwave was calibrated for each experiment using a standard of DPPH (g=2.0036) located in the second cavity. Computer simulations were used when necessary to check spectral parameters and to establish the contribution of each signal to the total intensity.
4. Adsorption and/or desorption treatments were carried out in a conventional vacuum line, achieving pressures down to $10^{-4}$ N.m$^{-2}$. Irradiation treatments at 77 K were carried out placing the cell in a quartz dewar flask without any metallic coating, and filled with liquid $N_2$. For these experiments the UV sources were three fluorescent lamps (Osram Eversun L40 W/79K), which emits their maximum intensity at 350 nm.
5. EPR spectra of the UV-irradiated $TiO_2$ in the presence of adsorbed oxygen were obtained and the absence of ($g_1$=2.057, $g_2$=2.012, $g_3$=2.003) attributed to the bulk defects indicate good crystallinity (i.e., better than 70%).

3. Surface Hydration

The level of surface hydration of $TiO_2$ was measured via Fourier Transform Infrared Spectroscopy and Thermogravimetric and Differential Thermal Analyses.

(1) Fourier Transform Infrared Spectroscopy
1. 10 mg of potassium bromide (reference sample) was placed on the sample holder of a diffuse reflectance infrared Fourier transform spectroscopic (DRIFTS) cell.
2. the cell was positioned in a Praying Mantis mirror assembly (Harrick) and placed in the Perkin Elmer Spectrum GX FTIR.
3. The chamber was purged with dry and carbon dioxide free air until the signal stabilized after 15 min.
4. Reflectant mode of the FTIR was used to observe the background signal.
5. 10 mg sample was placed on the sample holder of the diffuse reflectance infrared Fourier transform spectroscopic (DRIFTS) cell.
6. The cell was positioned in a Praying Mantis mirror assembly and placed in the FTIR.
7. The chamber was purged with dry and carbon dioxide free air until the signal stabilized after 15 min.
8. Reflectant mode of the FTIR was used to observe the present of the hydroxyl group.
9. The sample was scanned from 400 cm$^{-1}$ to 4000 cm$^{-1}$ at room temperature at a resolution of 1 cm$^{-1}$.
10. The number of scan was 256.

Figure 6:
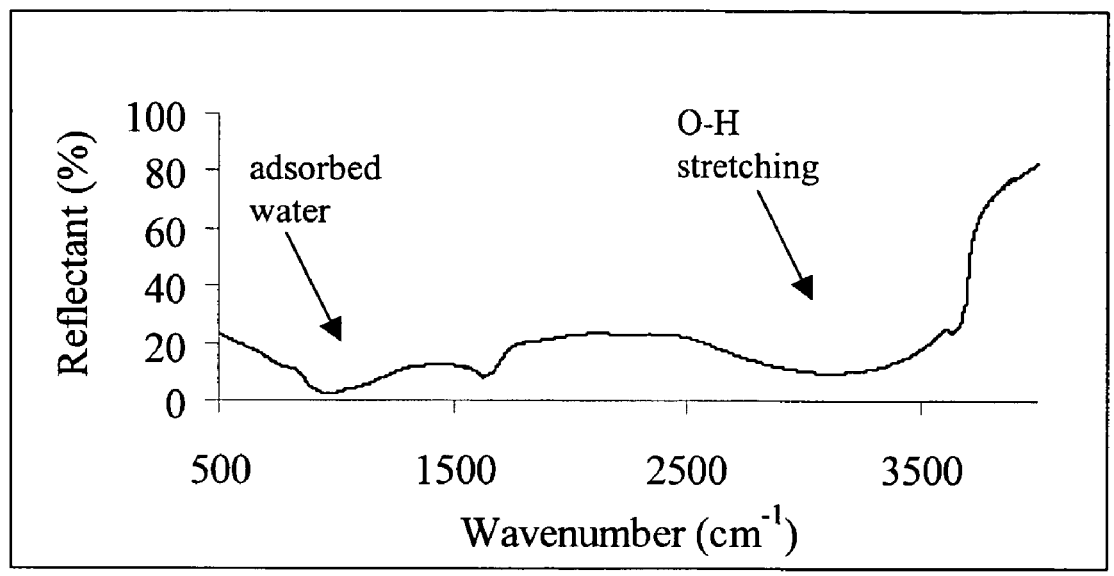
FIG. 6 shows a Diffuse reflectance infrared fourier transform (DRIFT) spectrum of a hydrated $TiO_2$.

FIG. 6 shows a DRIFT spectrum of a hydrated $TiO_2$. A broad peak near 3300 cm$^{-1}$ was ascribed to O—H stretching. A peak appearing at around 1600 cm$^{-1}$ has been associated with Ti—OH. Adsorbed water gives a broad peak at around 1000 cm$^{-1}$ (2) Thermogravimetric and Differential Thermal Analysis
1. 40 mg of alpha alumina powder was placed in platinum holder 1 and 30 mg of sample+10 mg of alpha alumina was placed in platinum holder 2.
2. 10 mg of alpha alumina powder was place inside another platinum holder and 30 mg of sample was placed on the top of the alpha alumina powder.
3. Both platinum holder were placed inside the Thermogravimetric Analyzer/Differential Thermal Analyzer (TGA/DTA, Setaram, 31/1190) with a heating range from 25° C. to 1600° C.
4. The experiment was started after the weight of the sample gave a constant value.
5. The sample was analysed from 25° C. to 800° C. at a heating rate of 5° C. /min in air.
6. The resolution of the temperature change was 0.01° C. and the resolution for the weight change was 0.001 mg.

27.

After the temperature heated to 800° C., the whole system was cooled down by water.

8. The collected signal for the heat change and weight change of the sample was obtained after the reference signal was subtracted from the sample signal.

Figure 7:
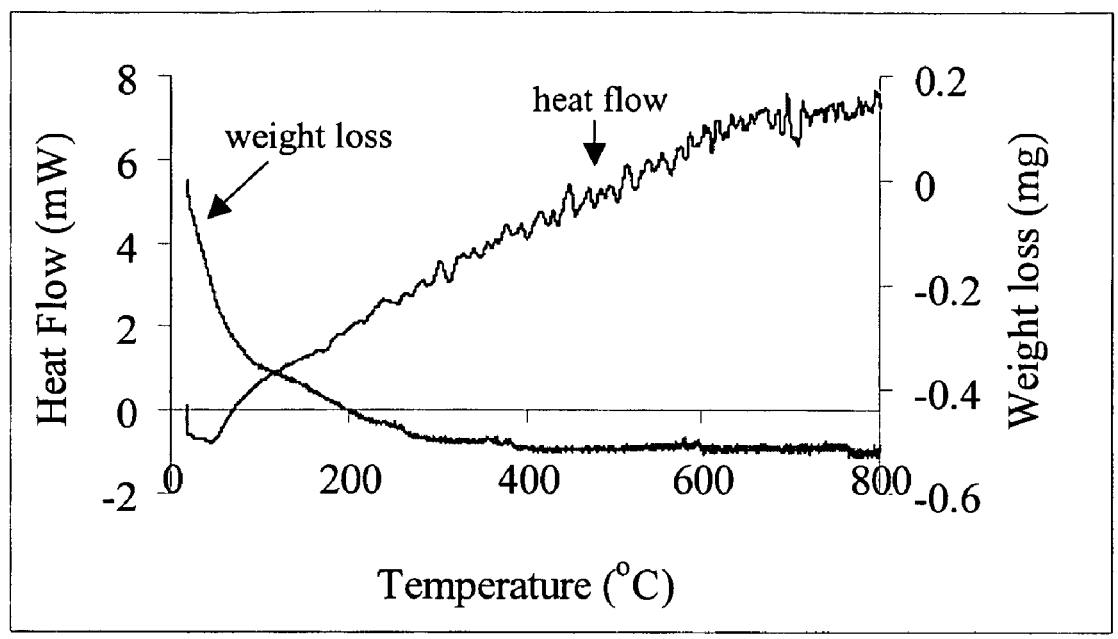
FIG. 7 is a thermogravimetric and differential thermal analyses of a $TiO_2$.

FIG. 7 displays a typical thermogravimetric and differential thermal analyses of $TiO_2$ sample. Adsorbed water desorbs at temperatures below 100° C. with an endothermic heat flow that peaked at around 50° C. The hydrogen bonded water is lost at 100-200° C.

4. Characteristics of Deposited $VO_x$

The $NH_4VO_3$-impregnated $TiO_2$ powder was placed in a flow cell made of quartz, 100 sccm of 100 $g/m^3$ ozone in oxygen was feed to the flow cell, the flow cell was heated to 200 ° C. and the $TiO_2$ powder was treated for 2 hours. The deposited vanadium oxide is then characterized by the following methods.

(1) Micro-Raman Analysis

1. Raman spectra were run with a single monochromator Renishaw System 1000 equipped with a cooled CCD detector (−73° C.) and holographic super-Notch filter.
2. The holographic Notch filter removed the elastic scattering while the Raman signal remained very high.
3. The samples were excited with a 514 nm Ar line.
4. The spectral resolution was ca. 3 $cm^{-1}$ and spectrum acquisition consisted of 20 accumulations of 30 s.
5. The spectra were obtained under dehydrated conditions (ca. 120° C.) in a hot stage (Linkam TS-1500).

Figure 8:
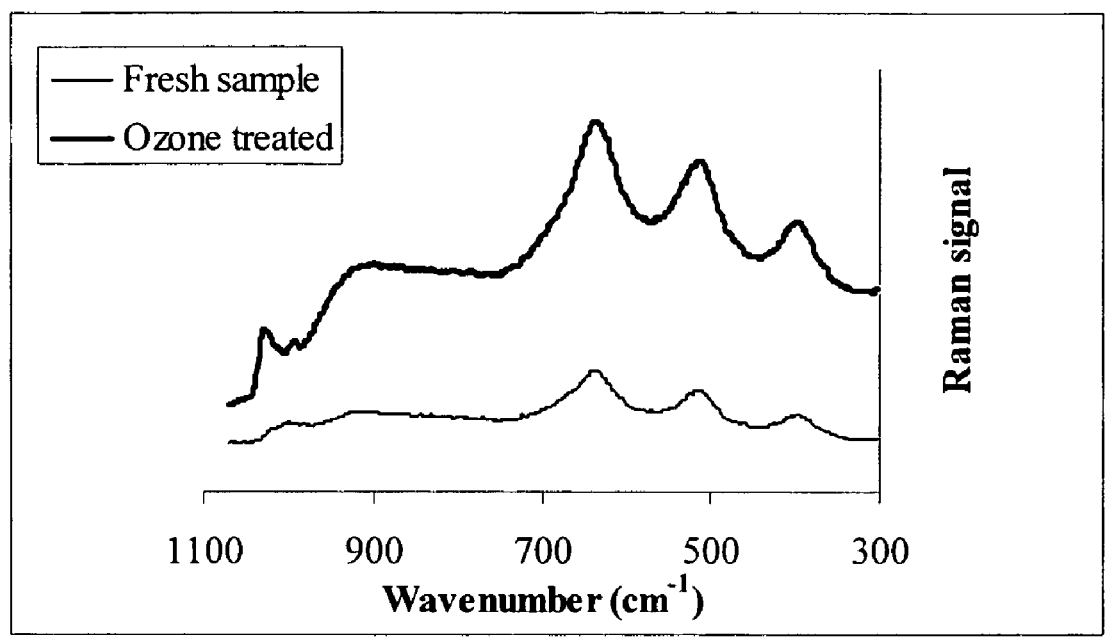
FIG. 8 is a Raman analysis of vanadium oxide on $TiO_2$.

FIG. 8 displays the Raman shift of vanadium oxide on $TiO_2$. Raman band at 1017 $cm^{-1}$, which corresponds to the terminal V=O bond mode. The broad Raman band near 900 $cm^{-1}$ is the characteristic of V—O—V stretching mode of surface polymeric vanadia species. A new weak additional Raman band after ozone treatment near 990 $cm^{-1}$ corresponds to the stretching mode of V=O is crystalline $V_2O_5$. Vanadia precursor was oxidized to vanadium oxide with ozone treatment.

(2) Temperature Programmed Reduction

1. A piece of quartz wool was place at the bottom of one leg of a U-shape quartz tube.
2. 0.1 g of the powder was placed on the quartz wool.
3. The quartz tube was placed inside the furnace of the Altamira AMI-200 catalyst characterization system.
4. The sample was purged with 50 sccm argon (99.99%) at 100 ° C. for 2 hours.
5. Temperature programmed reduction was conducted by heating the sample from 100° C. to 800° C. at 10° C./min in 50 sccm 10% hydrogen-argon gas mixture.
6. 3 calibration pulses with 10% hydrogen in argon (50 sccm) were obtained for reference.
7. The reducibility of the sample could be calculated from the equation:

Calibration value=(loop volume)(percent analytical gas)/(mean calibration area)(100)

Uptake(μmole/g cat)=(analytical area)(calibration value)/(sample weight)(24.5)

Figure 9:
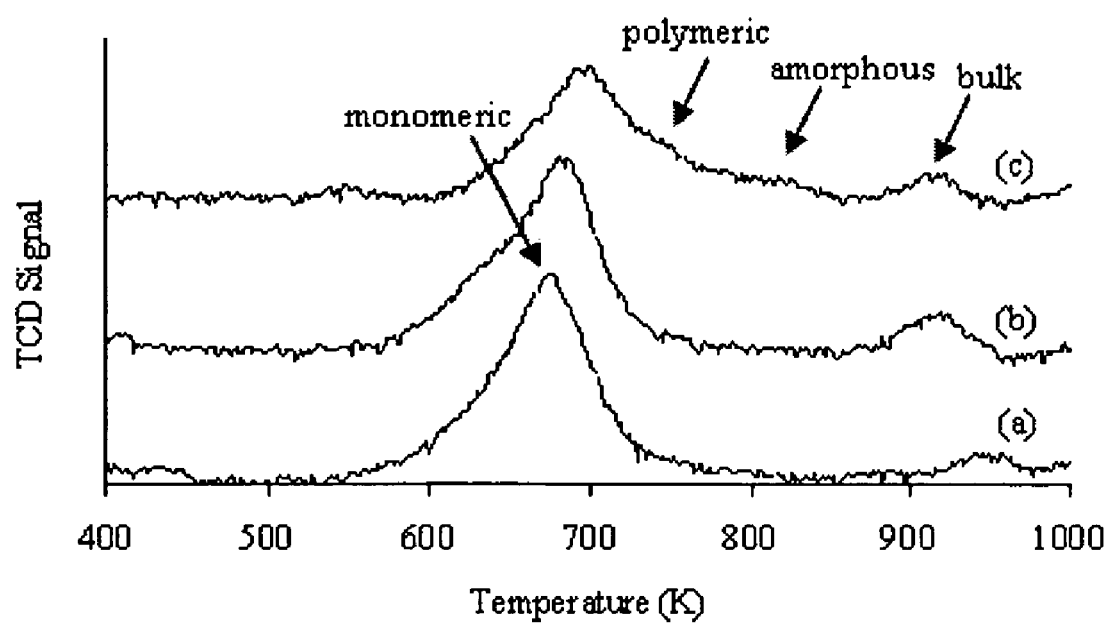
FIG. 9 is a Temperature programmed reduction (TPR) of (a) monolayer, (b) half of a monolayer, (c) quarter of a monolayer of vanadium oxide on the $TiO_2$.

FIG. 9 shows TPR of (a) monolayer, (b) half of a monolayer, (c) quarter of a monolayer of vanadium oxide on the $TiO_2$.

5. Metal Loading and Dispersion (1) The Loading of the Metal Catalyst is Determined by the Following Steps:

1. The catalyst was dissolved in aqua regia (18 parts concentrated HNO3 with 82 parts concentrated HCl),
2. The mixture was heated to gentle boiling while stirring continuously,
3. The slurry was filtered and diluted with deionized water to a concentration in the calibrated range,
4. The catalyst loading was determined by using the inductively coupled plasma (PerkinElmer Optima 3000XL),
5. The machine was calibrated with 0.5-20 mg/ml of standard solution prepared from 1000 mg/ml of metal standard solution (Aldrich).

(2) Dispersion Measurement

Dispersion is usually defined as the ratio of the number of catalyst atoms exposed at the surface to the total number of catalyst atoms present in the sample.

Procedure:

1. A piece of quartz wool was place at the bottom of one leg of the U-shape quartz tube.
2. 0.1 g of powder sample was placed on the quartz wool.
3. The quartz tube was placed inside the furnace of the Altamira AMI-200 catalyst characterization system.
4. The sample was purged with 50 sccm argon (99.99%) at 300° C. for 2 hr, and then the temperature was decreased to 25° C.
5. Carbon monoxide chemisorption was performed by dosing 50 μl pulses of carbon monoxide (50% vol in helium). Thermal conductivity detector was employed for determining the amount of CO chemisorbed onto the metal surface.
6. A total of 20 pulses were used and the time between each pulse was 120 sec.
7. Three calibration pulses were obtained for reference.
8. The dispersion of the gold on the sample could be calculated by using the equation:

Calibration value=(loop volume)(percent analytical gas)/(mean calibration area)(100)

Uptake(μmole/g cat)=(analytical area)(calibration value)/(sample weight)(24.5)

Percent Dispersion=(uptake)(atomic weight)/(stoichiometry)(percent metal)

Hydrogen and oxygen chemisorption could also be used to measure the metal catalyst surface area.

6. BET Surface Area

The BET surface area of the catalyst was measured by nitrogen physisorption.

Procedure:

1. The capped quartz tube sample holder from Coulter SA 3100 nitrogen physisorption apparatus was weighted.
2. 0.1 g of catalyst was measured and placed inside the sample holder.
3. The holder was connected to the out-gassing port of the Coulter SA 3100.
4. The sample was outgassed at 120° C. for 2 hr.
5. The catalyst was weighed after outgassing and nitrogen physisorption was conducted at 77 K.
6. The BET surface area was calculated from the physisorption data.

7. X-ray Photoelectron Spectroscopy

The surface composition and chemistry of the catalyst was determined by X-ray photoelectron spectroscopy (XPS).

Procedure:
1. The catalyst powder was pressed onto an indium foil.
2. The foil was placed inside the X-ray photoelectron spectroscopy (Physical Electronics PHI 5600).
3. The sample was outgassed at ultra high vacuum.
4. Monochromatic Al Kα X-ray source with 350 W at 45° C. was used to bombard the sample.
5. The data was collected using carbon 1S as the reference.

8. Particle Morphology and Properties of Samples Prepared by Microwave Treatment The particle morphology of the sol samples prepared by microwave treatment was characterized by atomic force microscopy (AFM, Nanoscope IIIa). The sol samples imaged by AFM were prepared by depositing 10 microliter of diluted sol sample onto a freshly cleaved mica surface. The deposited sample was dried at room temperature. $n^+$-silicon tip (Nanosensors) was used for tapping mode AFM imaging experiment.

Figure 10:
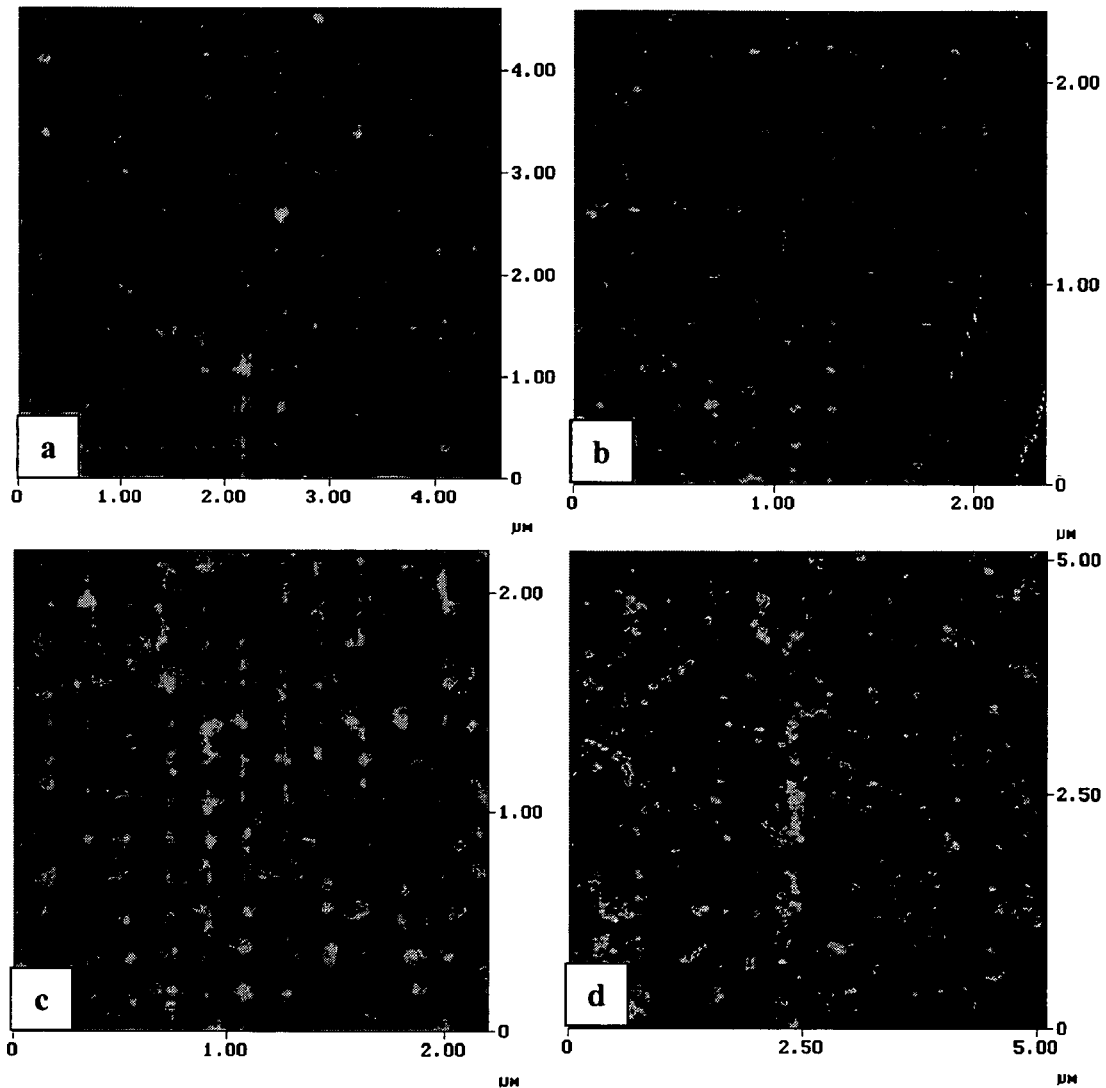
FIG. 10 shows the Tapping-mode (TM) Atomic Force Microscopy (AFM) images of titanium dioxide sols prepared by microwave sol-gel method with different power (a) 0 W, (b) 50 W, (c) 70 W, (d) 90 W.

FIG. 10 and Table 6 display the TM-AFM morphologies and properties of titanium dioxide sols prepared by the present method, respectively. It is obvious that the spherical primary sol particles with narrow size distribution of around 20 nm dispersed well in the FIG. 10(a). Using microwave heating, the primary particles still maintained their size and dispersion if the power was set as 50 W (see FIG. 10(b)). Increasing the microwave power, it is seen in FIGS. 10(c) and (d) that lots of primary particles form lost aggregation of different sizes and shapes. The size of primary particle also showed an increase. As the power increased to above 120 W, stable sol was not produced. Instead, powder precipitation occurred (see Table 6). It appeared that the microwave treatment allowed for the rapid heating and extremely rapid kinetic of crystallisation.

Figure 11:
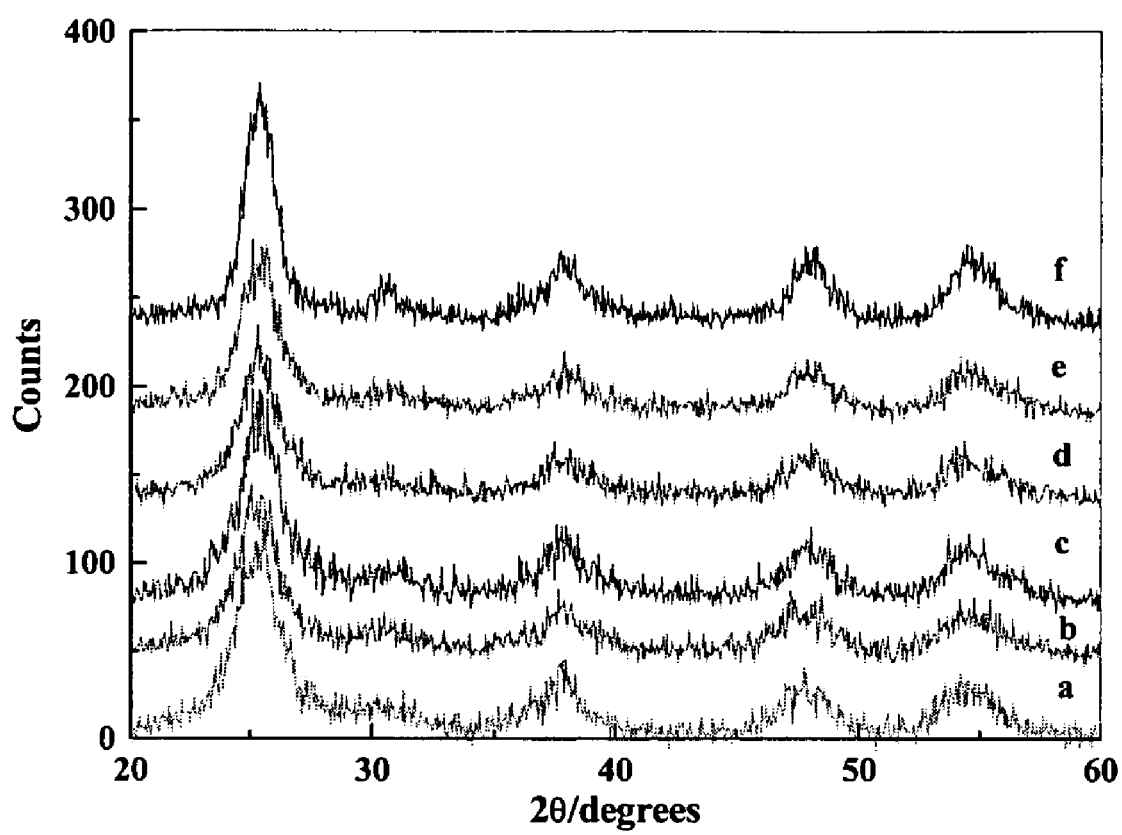
FIG. 11 shows the X-ray diffraction patterns of $TiO_2$ sample prepared by microwave sol-gel method with different power (a) 0 W, (b) 50 W, (c) 70 W, (d) 90 W, (e) 120 W, (f) 250 W.

The crystalline structures of the obtained gel samples were characterized by XRD and their patterns are shown in FIG. 11. Several broad peaks were observed at values of 2θ equal to around of 25°, 38°, 47° and 54° that attributed to the anatase structure. A small broad signal at 31° was ascribed to $TiO_2$ brookite traces in the samples (e.g. Table 6). By measuring the full width at half maximum (FWHM) of the peak at 2θ equal to 25°, the gain size of anatase was calculated by Scherrer equation and the data are listed in Table 6. All the samples had small crystal sizes about 3 to about 5 nm and the size increased with stronger microwave power, except for the $TiO_2$-MW70 sample.

Figure 12:
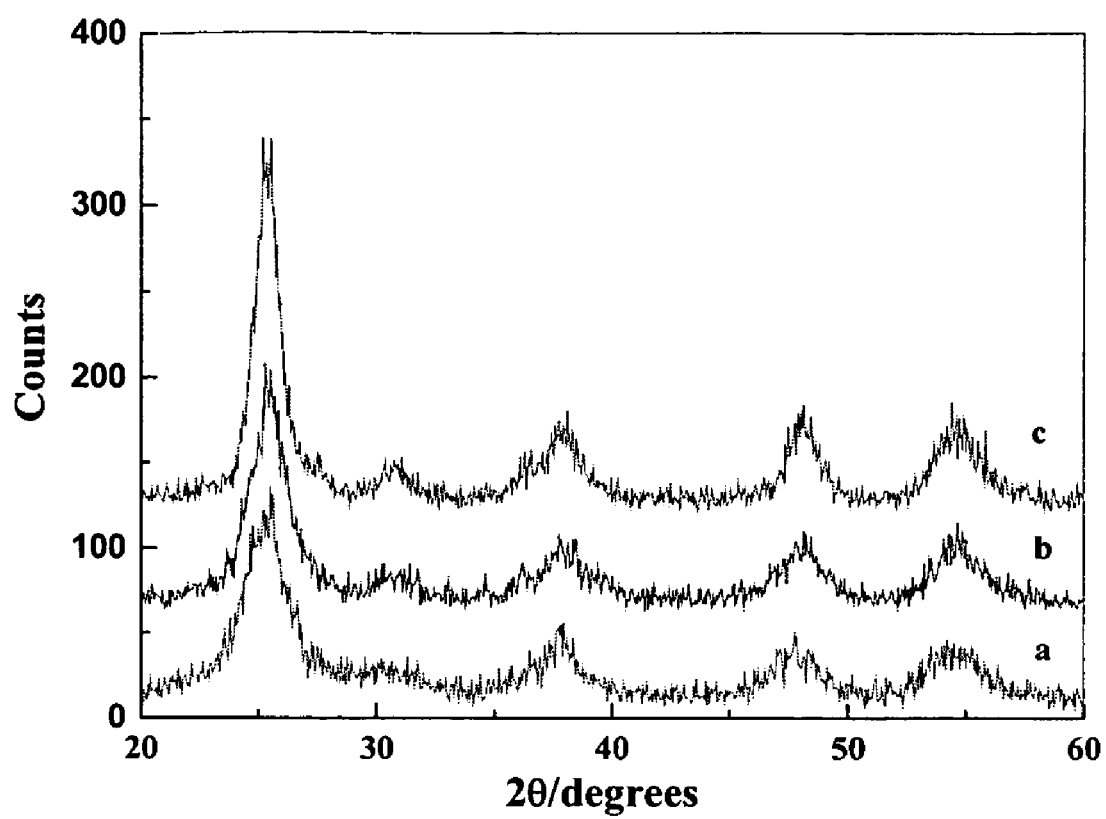
FIG. 12 shows the X-ray diffraction patterns of $TiO_2$ sample after treatment at different conditions (a) dried in the vacuum box, (b) calcined at 200° C., (c) calcined at 400° C.
Figure 13:
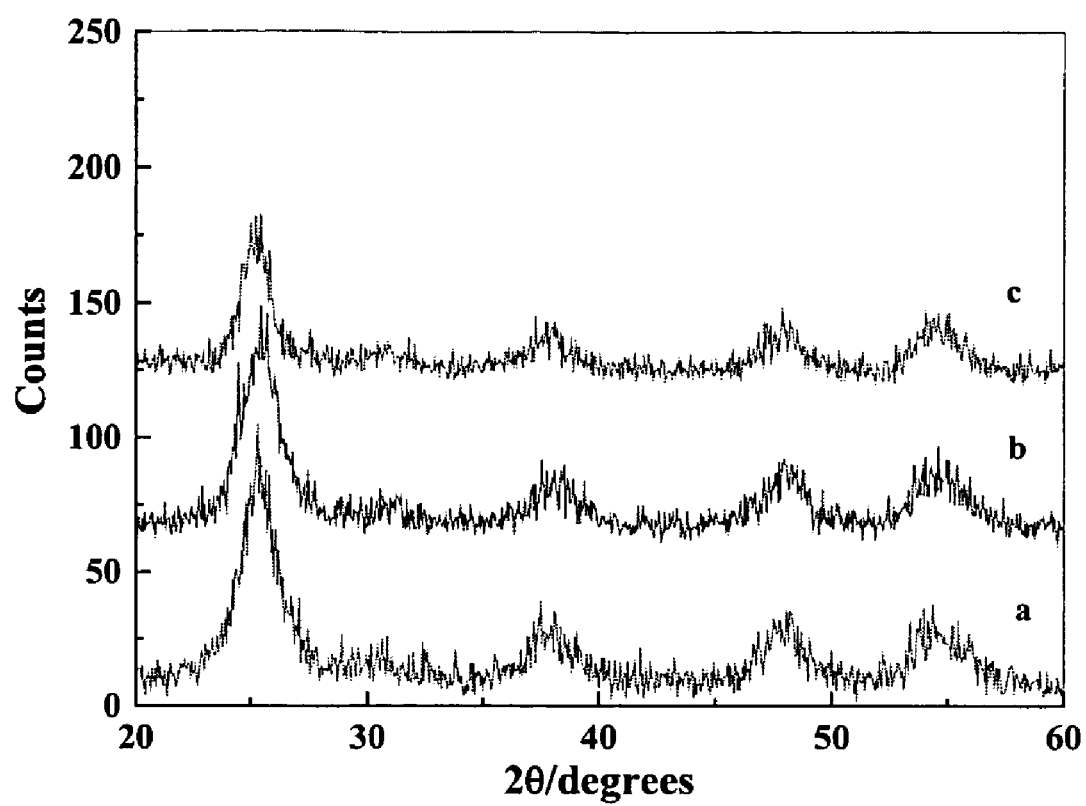
FIG. 13 shows the X-ray diffraction patterns of $TiO_2$-MW90 sample after treatment at different conditions (a) dried in the vacuum box, (b) calcined at 200° C., (c) calcined at 400° C.
Figure 14:
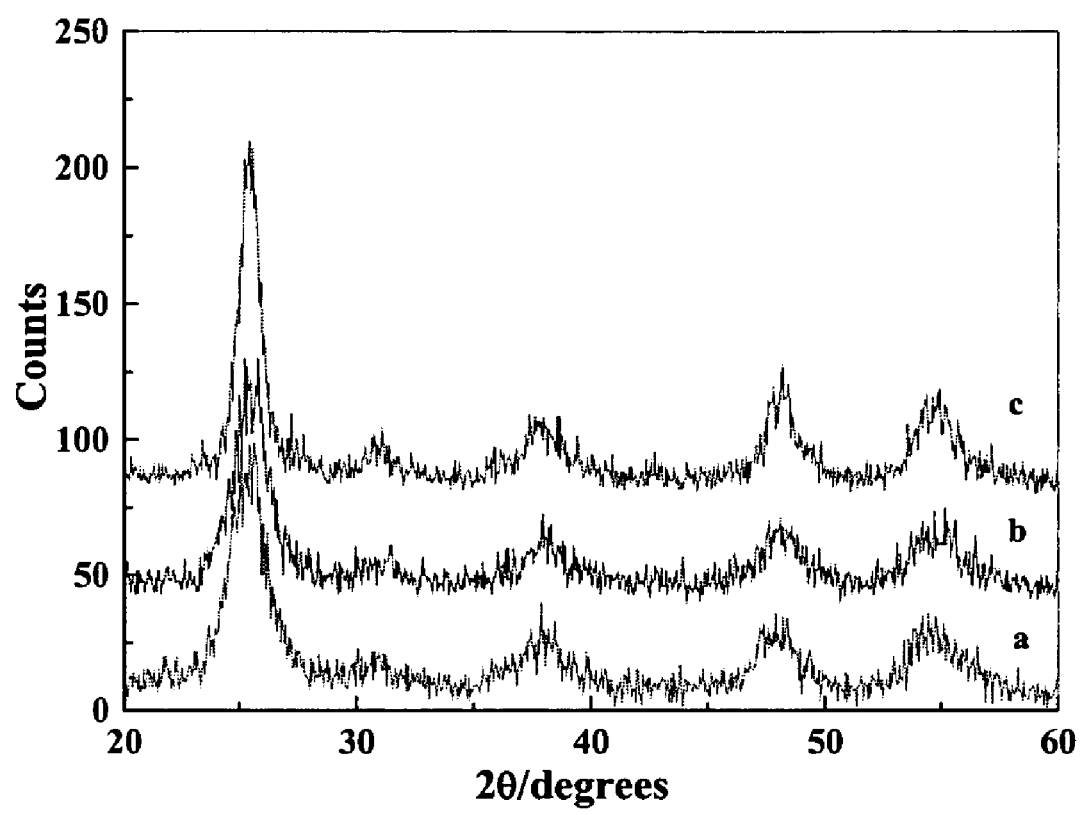
FIG. 14 shows X-ray diffraction patterns of $TiO_2$-MW120 sample after treatment at different conditions (a) dried in the vacuum box, (b) calcined at 200° C., (c) calcined at 400° C.
Figure 15:
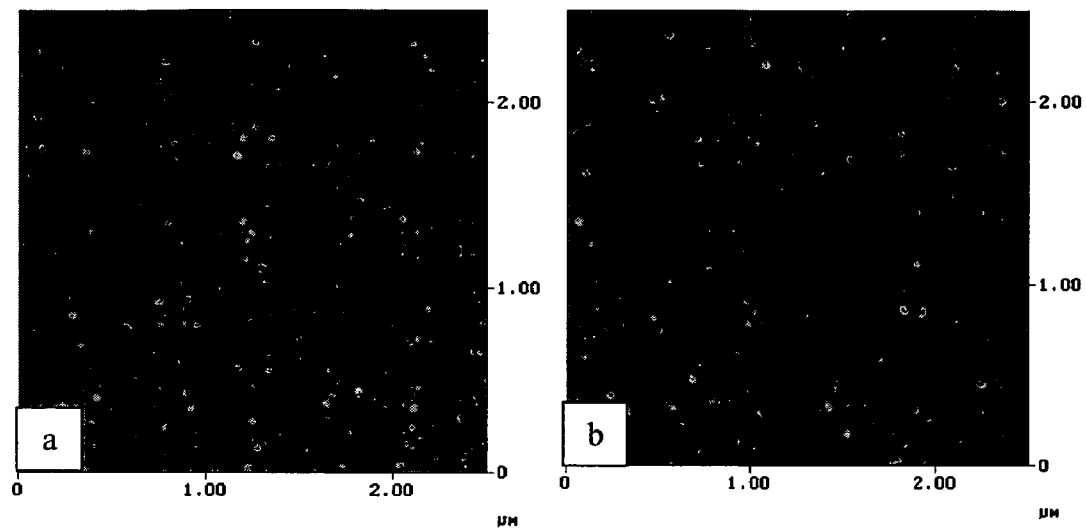
FIG. 15 shows the TM-AFM images of $TiO_2$ sol sample prepared by PEG assisted sol-gel method (a) without microwave treatment, (b) microwave heating at 90 W.

According to the above AFM and XRD data, three different samples (i.e.$TiO_2$, $TiO_2$-MW90 and $TiO_2$-MW120) were selected as examples to demonstrate the influence of preparation method on the material properties. FIGS. 12-14 display the XRD patterns of the samples after different temperature calcination and Table 7 summarizes the BET surface area and crystal size of thermally treated samples. It was clear that $TiO_2$ crystallized by microwave method possessed larger surface area and were less susceptible to thermal sintering. The loss of support surface area was one of the causes for sintering of metal catalyst. Further improvement on the thermal stability of the support was achieved by using PEG assisted microwave method. FIG. 15 illustrates the AFM images of the PEG modified $TiO_2$ sol samples. Compared with the unmodified $TiO_2$ sample shown in FIG. 10, only high-dispersed spherical sol particles with narrow size distribution appeared in both samples. Also, the sample maintained a large surface area and small crystal size even after thermal treatment at 400° C. (Table 7).

Figure 16:
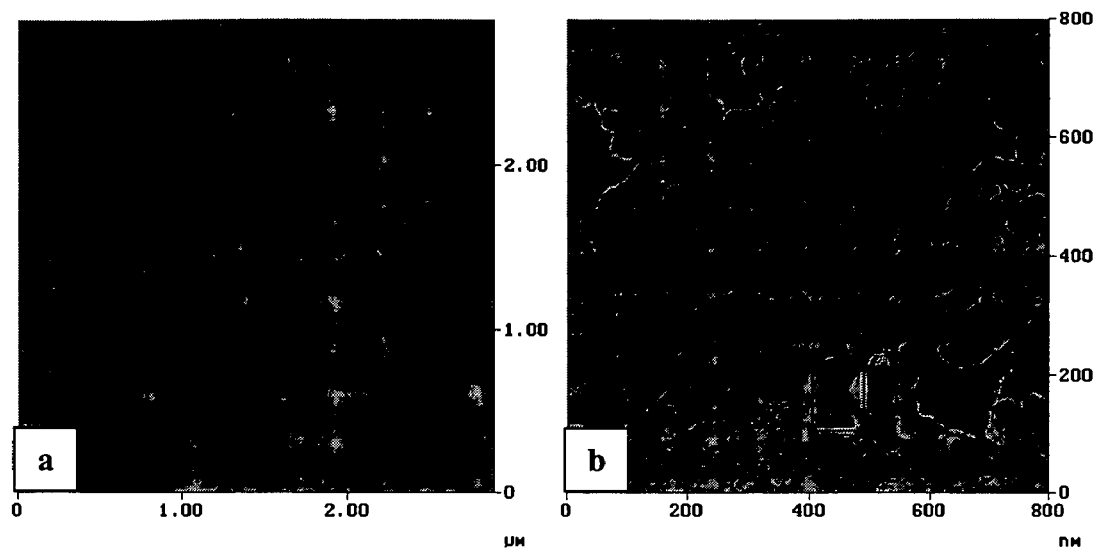
FIG. 16 shows the TM-AFM image of $TiO_2$-PEG-MW120 sample (a) height image, (b) phase image.
Figure 17:
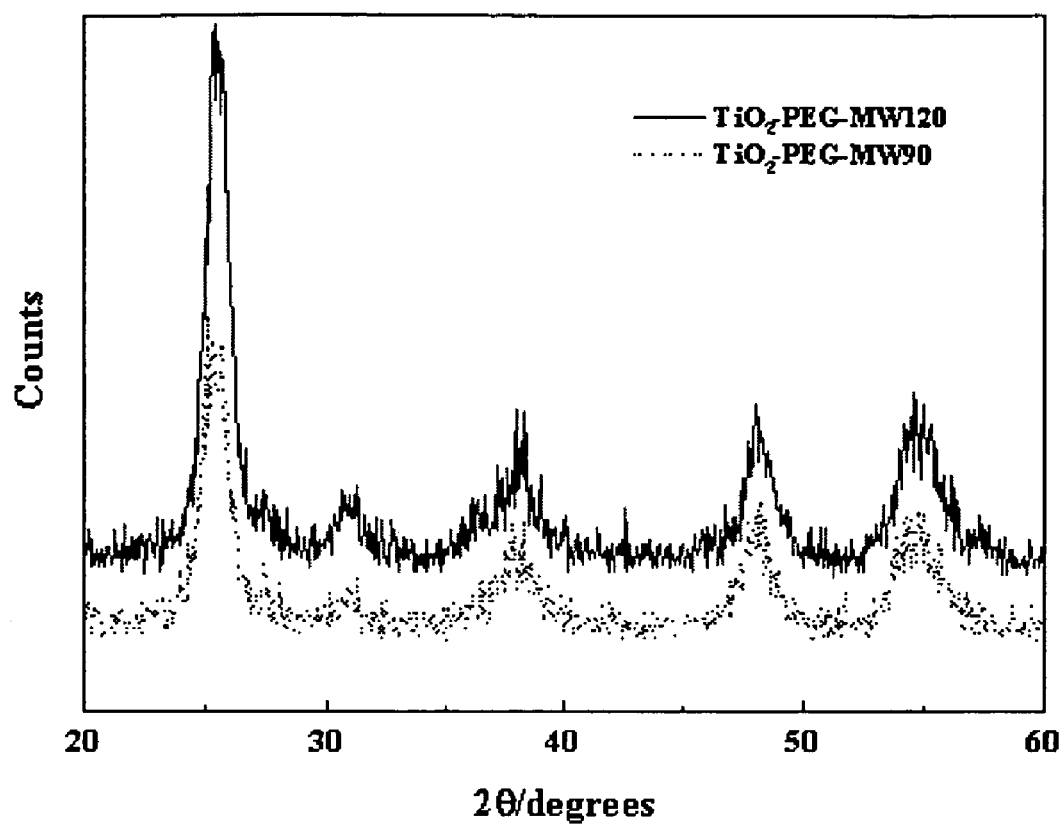
FIG. 17 shows the XRD patterns of $TiO_2$ sample prepared by PEG assisted microwave method.

Applying higher microwave power (120 W), the sol changed color from light-blue to white, but no precipitation occurred. FIG. 16 shows the particle morphology of $TiO_2$-PEG-MW120 sample. From the phase image pattern in FIG. 16(b), the colloid consisted of aggregated particles with various shapes (e.g. label A). After high temperature annealing (450° C.) to decompose the PEG polymer, anatase phase (FIG. 17) with grain size of about 7.16 and about 7.49 nm can be obtained for $TiO_2$-PEG-MW90 and $TiO_2$-PEG-MW120 samples, respectively.

Table 6 shows the XRD characterization results for $TiO_2$ samples prepared by microwave treatment. Table 7 shows the XRD and BET characterization results for $TiO_2$ samples prepared by microwave treatment.

TABLE 6

XRD characterization results

| Sample No. | Microwave Power | Phase | Property of solution | Gain size[a] |
|---|---|---|---|---|
| $TiO_2$ | N/A | Anatase* | Aqueous sol | 3.29 nm |
| $TiO_2$-MW50 | 50 W | Anatase* | Aqueous sol | 4.26 nm |
| $TiO_2$-MW70 | 70 W | Anatase* | Aqueous sol | 3.86 nm |
| $TiO_2$-MW90 | 90 W | Anatase* | Aqueous sol | 4.21 nm |
| $TiO_2$-MW120 | 120 W | Anatase* | White solution with large precipitate | 4.55 nm |
| $TiO_2$-MW250 | 250 W | Anatase* | White solution with large precipitate | 5.25 nm |

*These samples have small amount of brookite phase <5%.
[a]Gain size calculated by XRD analysis.

TABLE 7

XRD and BET characterization results

| Sample No. | Heat treatment conditions (° C.) | Specific surface are ($m^2/g$) | Gain size (nm)* |
|---|---|---|---|
| $TiO_2$ | Room-temperature | 132.567 | 3.29 |
| | 200 | 166.953 | 4.61 |
| | 400 | 105.904 | 6.29 |
| $TiO_2$-MW90 | Room-temperature | 156.031 | 4.21 |
| | 200 | 169.221 | 4.35 |
| | 400 | 128.878 | 5.22 |
| $TiO_2$-MW120 | Room-temperature | 191.194 | 4.55 |
| | 200 | 192.326 | 4.34 |
| | 400 | 109.345 | 7.50 |
| $TiO_2$-PEG | 400 | 235.726 | 5.37 |

Summary of the Characterization Results

Table 8 lists the BET surface area, particle size, and surface atomic ratio of the supported catalyst prepared on thermally crystallized $TiO_2$. The samples have small particle size within about 11 nm to about 14 nm and large BET area as compared to commercial P25 $TiO_2$ powder (e.g. around 50 $m^2/g$).

TABLE 8

| Sample | $TiO_2$ Particle Size (nm) | BET Area ($m^2/g$) | Surface Atomic Ratio, M2/Ti |
|---|---|---|---|
| $TiO_2$ | 11.0 | 98 | Nil |
| Au—$TiO_2$ | 11.8 | 77 | N.A. |
| $VO_x$—$TiO_2$ | 14.3 | 62 | 0.2028 |
| Au—$VO_x$—$TiO_2$ | 13.7 | 84 | 0.1195 |

Table 9 summarizes the catalysts prepared under thermal and hydrothermal treatment and with different Au or Pt loading percentage. The XRD analysis indicated that the catalysts prepared by thermal and hydrothermal methods were anatase, with a crystal size of about 13 and about 12 nm respectively.

TABLE 9

List of the prepared Samples

| Samples | Treatment | Preparation Condition | Au or Pt loading (wt %) | TiO$_2$ Particle size (nm) | BET surface area (m$^2$/g) | Phase |
|---|---|---|---|---|---|---|
| Au1T | Thermal | 723 K for 3 hours | Au/1 wt % | 13 | 155 | Pure anatase |
| Au2T | Thermal | 723 K for 3 hours | Au/0.1 wt % | 13 | 155 | Pure anatase |
| Au3T | Thermal | 723 K for 3 hours | Au/0.01 wt % | 13 | 155 | Pure anatase |
| Pt1T | Thermal | 723 K for 3 hours | Pt/1 wt % | 13 | 155 | Pure anatase |
| Pt2T | Thermal | 723 K for 3 hours | Pt/0.1 wt % | 13 | 155 | Pure anatase |
| Pt3T | Thermal | 723 K for 3 hours | Pt/0.01 wt % | 13 | 155 | Pure anatase |
| Au1H | Hydrothermal | 60 ml H$_2$O + 40 ml Isopropanol, 423 K for 8 hours | Au/1 wt % | 12 | 175 | Pure anatase |
| Au2H | Hydrothermal | 60 ml H$_2$O + 40 ml Isopropanol, 423 K for 8 hours | Au/0.1 wt % | 12 | 175 | Pure anatase |
| Au3H | Hydrothermal | 60 ml H$_2$O + 40 ml Isopropanol, 423 K for Anatase 8 hours | Au/0.01 wt % | 12 | 175 | Pure anatase |
| Pt1H | Hydrothermal | 60 ml H$_2$O + 40 ml Isopropanol, 423 K for 8 hours | Pt/1 wt % | 12 | 175 | Pure anatase |
| Pt2H | Hydrothermal | 60 ml H$_2$O + 40 ml Isopropanol, 423 K for 8 hours | Pt/0.1 wt % | 12 | 175 | Pure anatase |
| Pt3H | Hydrothermal | 60 ml H$_2$O + 40 ml Isopropanol, 423 K for 8 hours | Pt/0.01 wt % | 12 | 175 | Pure anatase |
| Pt1MW | Microwave | 250 W power | Au/0.2 wt % | 6 | * | Pure anatase |
| Pt2MW | Microwave | 250 W power | Au/0.24 wt % | 6 | * | Pure anatase |

*These samples have not been analyzed by BET surface area measurement.

Example 11

Testing the Reaction Rate of the Catalysts

Figure 18:
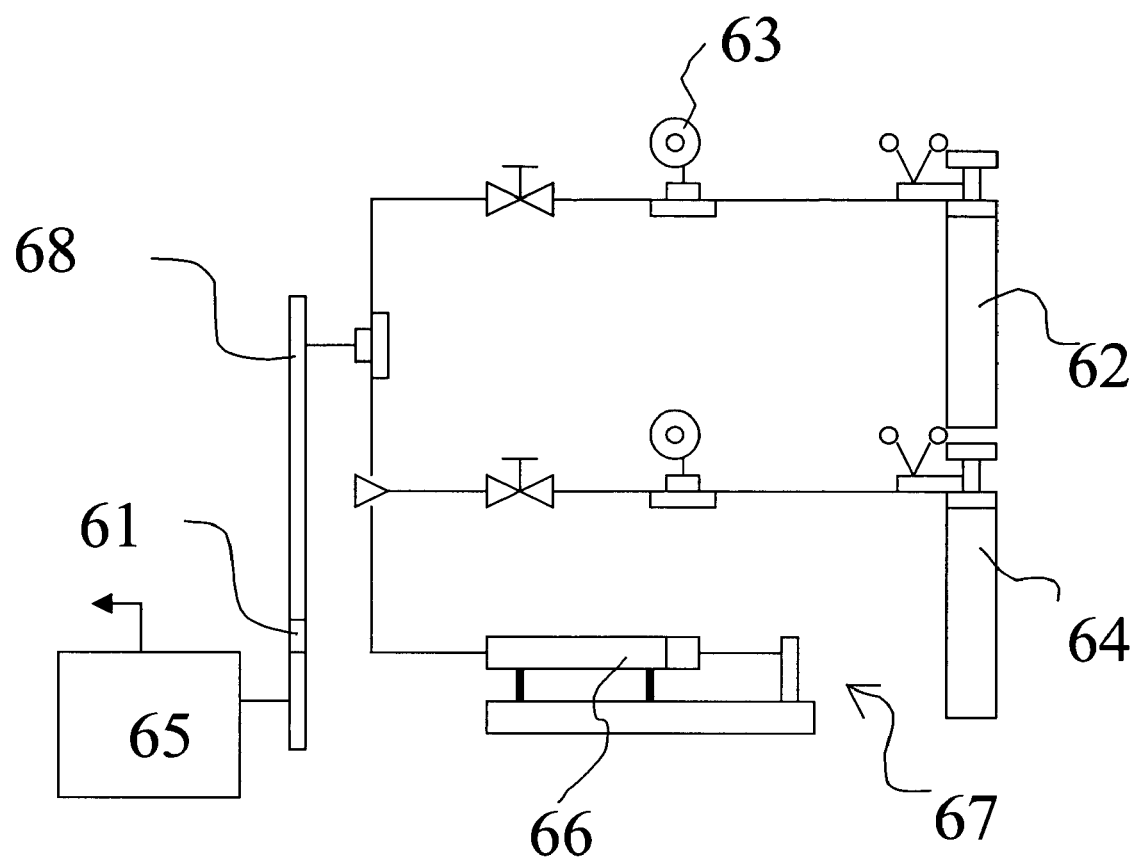
FIG. 18 shows the schematic diagram of the experimental setup used for evaluating the performance of catalysts for the gas-phase oxidation of carbon monoxide (CO) and toluene.

FIG. 18 shows the schematic diagrams of the experimental setup used for evaluating the performance of catalysts for the gas-phase oxidation of carbon monoxide (CO) and toluene. It consists of the synthetic air 62, CO 64, toluene (VOCs) 66 feed delivery modules, pressure regulator 63, glass reactor 68 and analytical instrument (i.e., gas chromatograph and on-line gas analyzer) 65. For CO oxidation test, synthetic air 62 and CO 64 was mixed before entering the glass reactor 68. The glass reactor 68 had dimensions of 18-inch length and ¼ inch O.D. The catalyst 61 (about 0.03 g) was placed 12 inch downstream from the entrance. The outlet gases were separated using a CTR1 column, which is inside the gas chromatograph, and analyzed using a gas chromatograph (HP 6890) 65. An on-line gas analyser (Bruel & Kjaer, Type 1302) was sometimes used in series with the gas chromatograph to provide transient data for the reaction. For the oxidation of toluene testing, the procedures were similar to the oxidation of CO except the liquid toluene feed was delivered by using a syringe pump (kdScientific 1000) 67. The toluene was vaporized by heating the stain steel pipe to 120° C. and was mixed with synthesis air before entering the glass reactor 68. The outlet gases were separated by using a 100% Carbowax 20M column.

Figure 19:
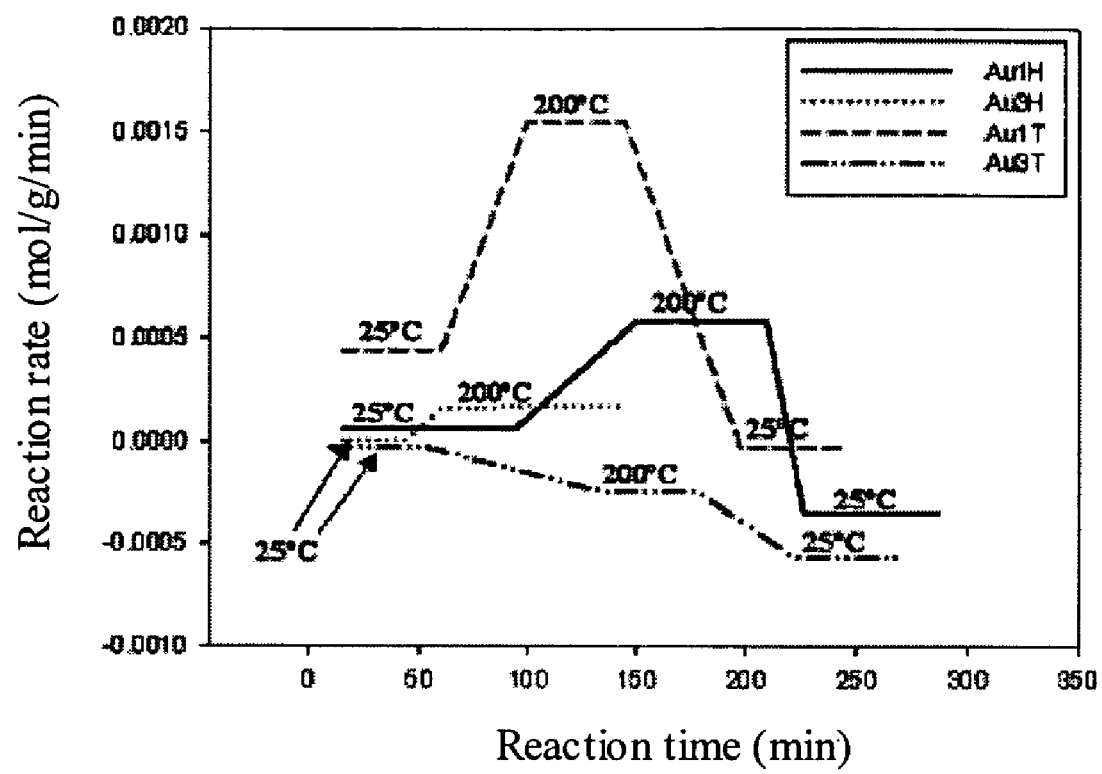
FIG. 19 shows the carbon monoxide reaction rate for samples Au1H, Au3T, Au1T and Au3H.

FIG. 19 plots the conversion rate of CO per mass of catalyst used as a function of reaction time for different catalyst (Au1H, Au3H, Au1T and Au3T). When Au1T and Au3T were compared, it was obvious that the reaction rate of Au1T was faster than Au3T for both 25° C. and 200° C. The same result was obtained when comparisons were made between Au1H and Au3H. This result suggested that the performance of the catalyst depend on the amount of Au on the TiO$_2$ support. The more Au contained in the catalyst, the faster the reaction rate of CO.

Figure 20:
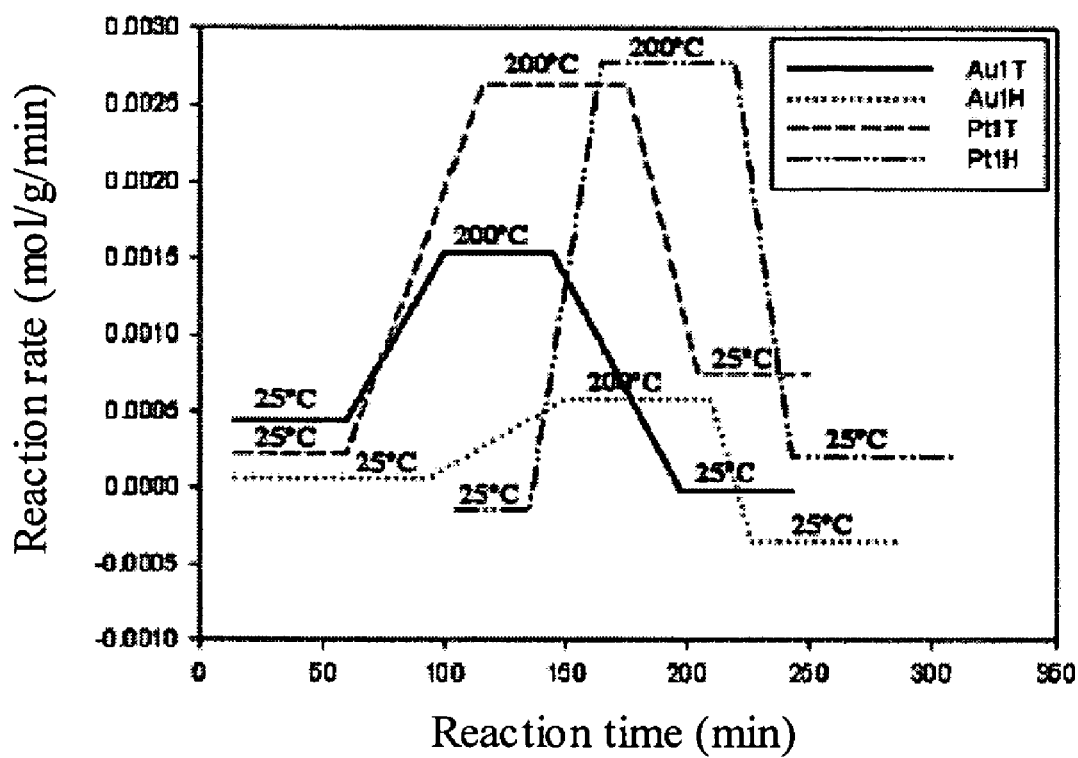
FIG. 20 shows the carbon monoxide reaction rate for samples Au1T, Au1H, Pt1T and Pt1H.

FIG. 20 plots the conversion rate of CO per mass of catalyst used as a function of reaction time for different catalyst (Au1T, Au1H, Pt1T and Pt1H). By comparing Au1T and Au1H, the reaction rate of Au1T was higher than that of Au1H, irrespective of the temperature at 25° C. or 200° C. Also, Pt1T and Pt1H were compared, although there was a comparable reaction rate at 200° C., the reaction rate of Pt1T was higher than that of Pt1H at 25° C. This result indicated that metal catalyst supported on thermal treated TiO$_2$ have better performance than that supported on hydrothermal treated TiO$_2$. For similar metal loading, the Pt catalyst was more active than the gold catalyst.

Example 12

Sustainability of the Catalysts in Reacting with CO and Toluene

In order to avoid the frequent replacement of the catalyst, the catalyst must be able to function over an extended period of time. An experiment was conducted to test the sustainability of the invented catalysts for oxidation reaction of CO and toluene.

Figure 21:
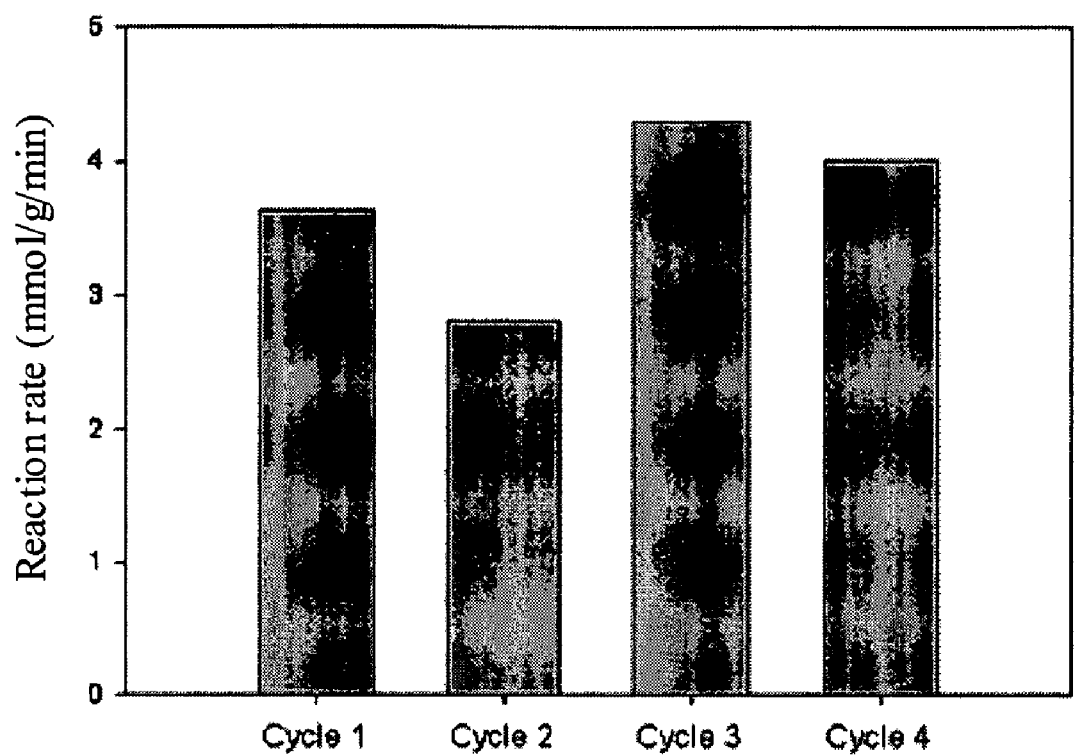
FIG. 21 shows the carbon monoxide reaction rate of sample Pt1T at 200° C. for 4 cycles.

FIG. 21 shows the reaction rate of Pt1T at 200° C. for 4 cycles. It shows that the reaction rate for the oxidation of CO was quite stable after the reaction of the 4 cycles. A cycle means that the temperature of the reaction alternately changed from 25° C. to 200° C. and then back to 25° C. Although Pt1T showed a decrease in the reaction rate after cycle 2 and cycle 4, there was an increase of reaction rate at cycle 3. This showed that the catalyst Pt1T has a stable reaction rate for the reaction of CO. After the sustainability test of the reaction of CO, another sustainability test for the toluene was conducted.

Figure 22:
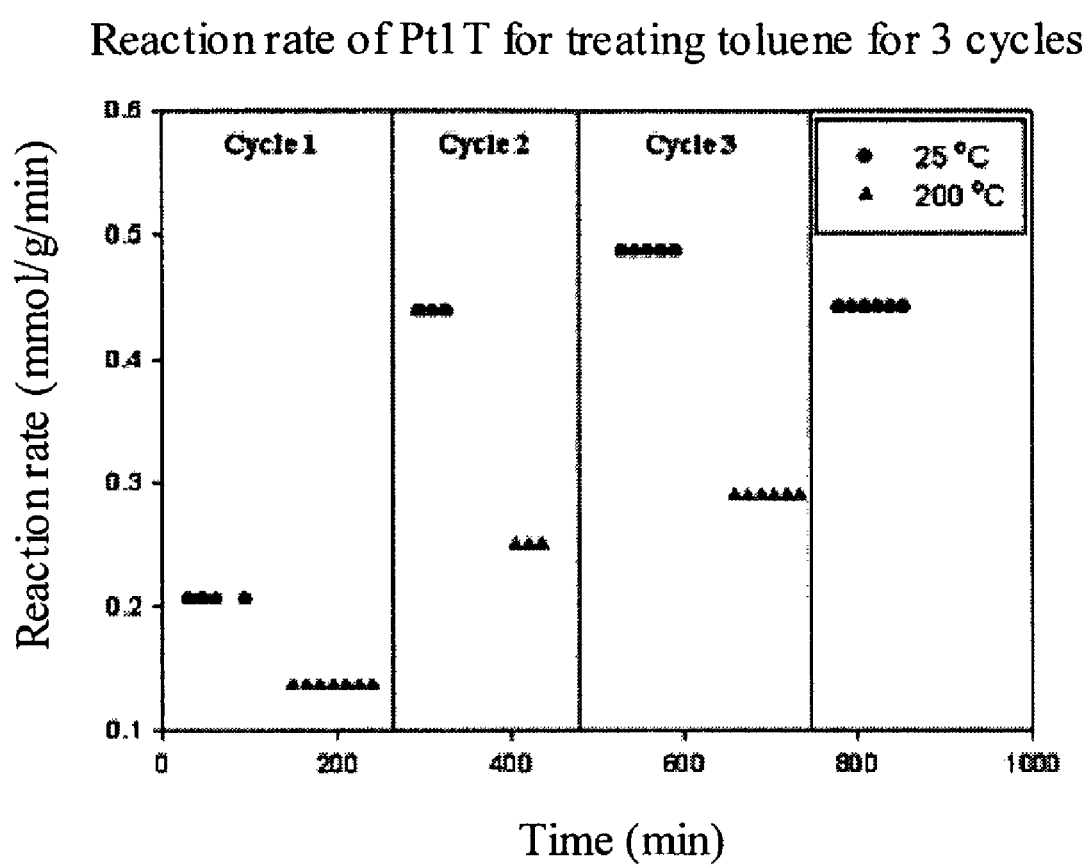
FIG. 22 shows the reaction rate of sample Pt1T for treating toluene for 3 cycles.

FIG. 22 shows the reaction rate of catalyst Pt1T for treating toluene for 3 cycles. It can be seen that the toluene reaction rate was increasing along the reaction time and the reaction rate at 25° C. was higher than that at 200° C., both of which deviate from normal phenomenon. Regardless of the abnormal results, FIG. 22 does suggest that Pt1T was effective in catalysing toluene oxidation and the reaction rate of toluene was quite stable after 3 cycles.

Example 13

The Performance of Catalysts on CO with Ozone Treatment and Vanadium Addition

Figure 23:
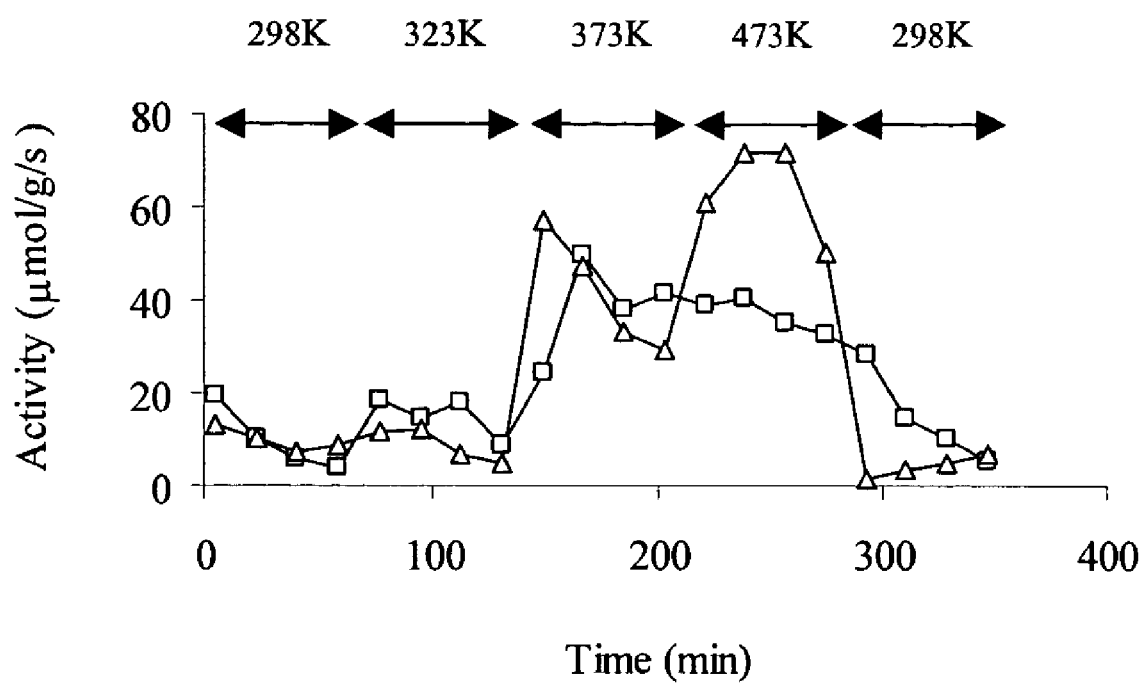
FIG. 23 is a plot of CO conversion rate of the $Au/TiO_2$ (□) and ozone treated $Au/TiO_2$ (Δ).
Figure 24:
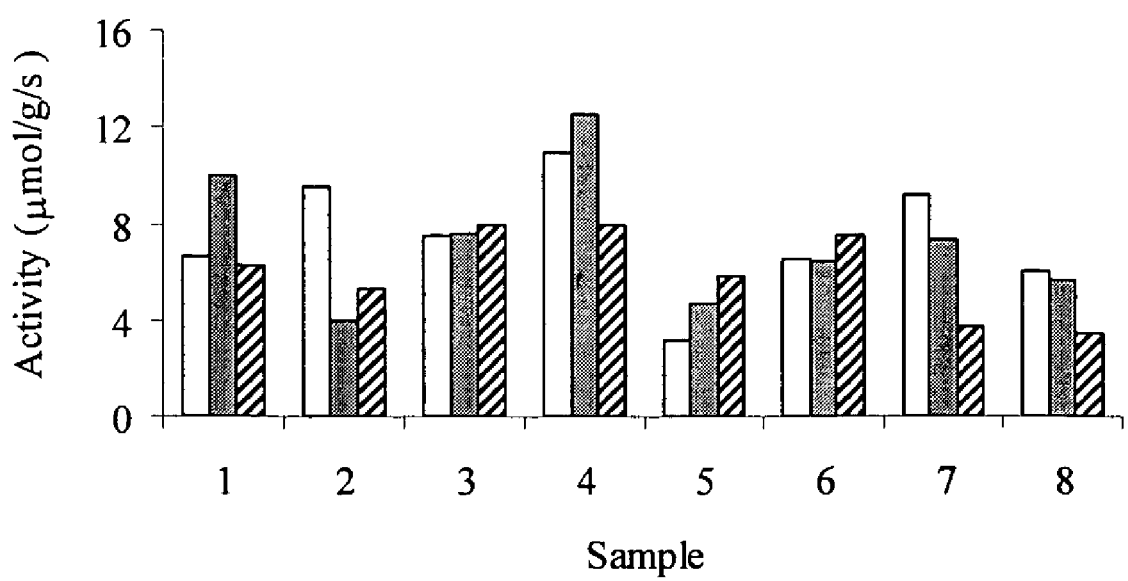
FIG. 24 is a plot for comparison of the CO conversion rate at 298 K for (1) $Au\text{-}TiO_2$; (2) $O_3$—Au—$TiO_2$; (3) Au-1V—$TiO_2$; (4) $O_3$—Au-1V—$TiO_2$; (5) Au-0.5V—$TiO_2$; (6) $O_3$—Au-0.5V—$TiO_2$; (7) Au-0.25V—$TiO_2$; (8) $O_3$—Au-0.25V—$TiO_2$ prior to heat treatment (□), after heat treatment in reaction mixture at 473 K (■) and after 48 h of reactions at room temperature (◪). As used herein, V represents the fraction of a monolayer of $VO_x$. For example, 1 V means 1 monolayer of $VO_x$, 0.5 V half monolayer of $VO_x$, and 0.25 V means a quarter of a monolayer of $VO_x$.

The catalyst was tested for CO oxidation in a differential plug flow reactor. About 30 mg of catalyst powder was reacted in a dry air stream containing about 2.5% carbon monoxide. Ozone pre-treatment of the support removed carbonaceous surface deposits and stabilized the deposited $VO_x$. FIG. 23 shows a plot of CO conversion rate of the $Au/TiO_2$ (□) and ozone treated $Au/TiO_2$ (Δ), which summarizes a typical reaction run. The $Au/TiO_2$ catalyst deactivated rapidly during the first hour of reaction at 298 K. Increasing the reaction temperatures led to higher conversion rates, but also resulted in an accelerated deactivation. Pre-treatment of $Au/TiO_2$ catalyst with ozone led to a better and more stable catalyst performance. FIG. 24 compared the performance of $Au/TiO_2$ and $Au-VO_x/TiO_2$ catalysts with and without ozone treatment. The results clearly showed that vanadium concentration affects catalyst activity and ozone pre-treatment consistently yielded better catalyst performance.

Example 14

Effectiveness in Destroying VOCs and Bacteria

A prototype was set up to test the effectiveness of the invented catalyst in degrading VOCs and bacteria. The prototype used about 2 g of Pt1T catalyst. The prototype performance was tested over ten months. Table 10 lists the performance of the prototype system operating at an airflow of 40 cfm (cubic feet per minute) at room temperature. No filter was used during the duration of experiments from May 2003 until February 2004.

Table 10 lists the performance of the prototype unit using Pt1T catalyst for different VOCs. Better than 50% reduction was obtained for air containing more than 100 ppm of VOC, and near 100% reduction for air polluted by less than about 30 ppm of VOCs. The VOCs were completely converted into carbon dioxide and water.

TABLE 10

| | Prototype Performance | | |
|---|---|---|---|
| Pollutants | Concentration in | Concentration out | Percent Removal per pass |
| Ethanol | 300 ppm | 58 ppm | 80 |
| Ethanol (1)-month 1 | 60 ppm | 15 ppm | 75 |
| Ethanol (2)-month 3 | 30 ppm | 0.3 ppm | 99 |
| Ethanol (3)-month 6 | 45 ppm | 0.2 ppm | 99 |
| Ethanol (3)-month 9 | 15 ppm | 0.2 ppm | 90 |

TABLE 10-continued

| | Prototype Performance | | |
|---|---|---|---|
| Pollutants | Concentration in | Concentration out | Percent Removal per pass |
| Acetone | 150 ppm | 40 ppm | 60 |
| Paint Thinner | 400 ppm | 180 ppm | 50 |
| Ethylbenzene | 100 ppm | 4 ppm | 95 |
| Toluene | 100 ppm | 40 ppm | 60 |
| Benzene | 150 ppm | 59 ppm | 60 |

Three different tests were conducted to measure the performance of the prototype for bioaerosol treatment.

(A) Bioaerosol Test 1.

The performance test of an air-cleaner Prototype on reduction of the bacterial species *Pseudomonas aeruginosa*, *B. subtilis* and *S. epidermidis*. The three tested bacteria were common airborne bacteria. All tests were carried out in accordance with the general preparation, handling and analysis protocols generally adopted in the area of Environmental Microbiology.

Procedure:

1. Stock culture of the bacterial cells was activated in liquid nutrient broth culture up to a cell density of $10^7$ to $10^8$ cells/ml.
2. The Prototype and the Andersen viable single-stage sampler were placed in an enclosed chamber with a distance of 60 cm.
3. Two 15 ml of sterilized distilled water were aerosolized with the nebulizer to saturate the chamber to minimize evaporative effect on the aerosolized cells and spores.
4. Relative humidity was kept at above 80% at room temperature (23-24° C.) throughout the test.
5. A 10 ml stock bacterial culture solution was aerosolized through the nebulizer into the chamber for the testing with the Prototype turned on and off (Control). Duplicate runs were conducted for both the test and control.
6. Air samples were collected at 0, 0.5, 1.0, 1.5, 2.0, 2.5, 3.0, 5 and 10 min intervals with the Andersen single-stage sampler loaded with Tryptic Soy Agar (TSA) for 10 second. The tests were conducted in the following sequence, (1) Control 1 (C1), (2) Test 1, the prototype was turned on after the zero time sampling (T1), (3) Test 2 (T2), the prototype was kept in ON mode, and (4) Control 2 (C2).

Figure 25A:
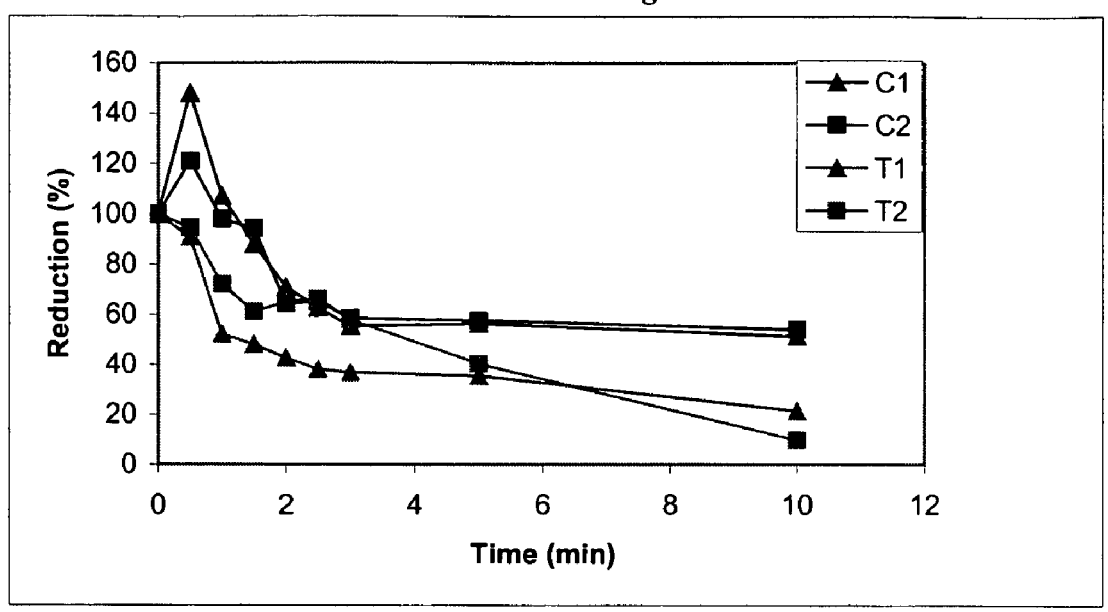
FIGS. 25A-C are plots showing the reduction of (a) *P. aeruginosa*, (b) *B. subtilis* and (c) *S. epidermidis* as a function of time by using Pt1T catalyst. This figure shows two repeated experiments where C1 is the control experiment 1, C2 is the control experiment 2, T1 is the test experiment 1, T2 is the test experiment 2.
Figure 25B:
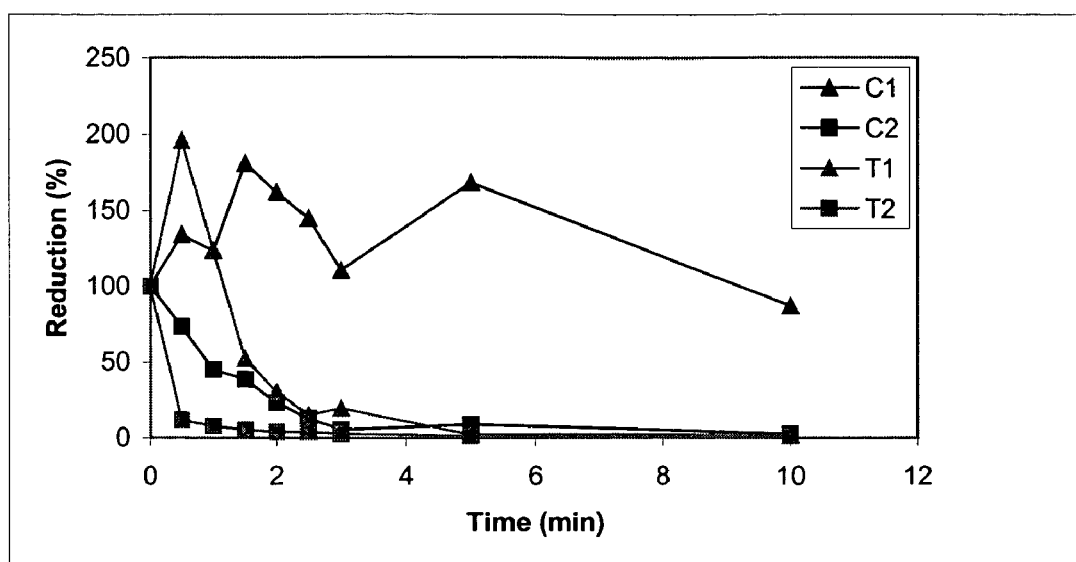
Figure 25C:
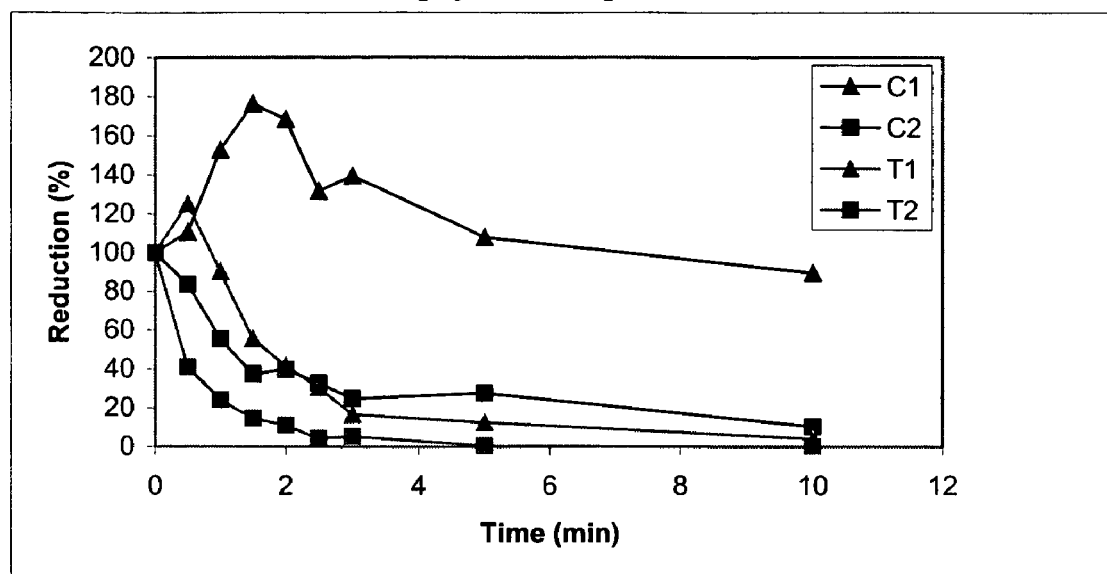

The results shown in FIG. 25 show that aerosolised *B. subtilis*, *S. epidermidis* and *P. aeruginosa*, were killed and destroyed in 0.5, 2 and 10 minutes, respectively. Swab test indicated no viable bacteria remained on the surface of the prototype unit.

(B) Bioaerosol Test 2.

The prototype unit was tested for the reduction of natural bioaerosol (i.e., bacteria and fungi) at a public canteen. The site has an average bioaerosol loading of 800 colony forming units/m³. Table 11 shows that about 64% of bacteria and about 87% of fungi were killed and destroyed in a single pass through the prototype.

TABLE 11

Prototype performance of bacteria and fungi degradation

| Item | | Position | Trial No. #1 | #2 | #3 | #4 | Reduction % (Average) |
|---|---|---|---|---|---|---|---|
| Normal mode | Bacteria | Inlet | 650 | 430 | 480 | — | |
| Airflow: ~7 m/s | | Outlet | 270 | 150 | 140 | — | |
| Tempt: ~38° C. | | Reduction % | −58% | −64% | −70% | — | −64% |
| | Fungi | Inlet | 50 | 70 | 90 | — | |
| | | Outlet | 7 | 18 | 0 | — | |
| | | Reduction % | −86% | −75% | −100% | — | −87% |

Remark: Data are collected on November 11 (Tue) at a public canteen between 12:00 and 15.00.

(C) Bioaerosol Test 3.

The prototype unit was tested for the reduction of natural bioaerosol (i.e., bacteria and fungi) and possible airborne pathogens found in a typical government clinic. Table 12 summarizes 6-months prototype test data conducted at a government clinic located in Wan Chai, Hong Kong.

TABLE 12

Prototype performance of bacteria and fungi degradation

| | Bacteria | | | Fungi | | |
|---|---|---|---|---|---|---|
| Test | Inlet (cfu/m$^3$) | Outlet (cfu/m$^3$) | Reduction (%) | Inlet (cfu/m$^3$) | Outlet (cfu/m$^3$) | Reduction (%) |
| October | 880 | 250 | 70 | 70 | 30 | 60 |
| November | 800 | 80 | 90 | 80 | 20 | 75 |
| December | 800 | 120 | 85 | 120 | 10 | 95 |

A bioaerosol survey of the clinic air was conducted. The bacterial species identification used Biomeieux API kit showed that the three most commonly occurring isolates were (1) & (2) two different species of *Micrococcus* and (3) *Staphylococcus epidermidis*. The fungal species were identified using colonial, hyphal and spore morphology. The following species were isolated (1) *Cladosporium*, (2)-(3) three species of *Penicillium*, (4) *Emmonsia*, (5) Yeast and (6) unknown specie.

Other Embodiments

The present invention is not to be limited in scope by the specification embodiments described, which are intended as single illustrations of individual aspects of the invention. Other embodiments will be evident to those of skill in the art. It should be understood that the foregoing detailed description is provided for clarity only and is merely exemplary. The spirit and scope of the present invention are not limited to the above examples, but are encompassed by the following claims.

We claim:

1. A catalytic material, comprising:
a first metal oxide and a metal catalyst,
wherein the first metal oxide comprises nano-sized crystal particles having
(a) size of about 4 to about 15 nm;
(b) crystallinity greater than about 60%; and
(c) a surface of hydration of about 5 to about 100 mg per gram of the dry metal oxide;
wherein the metal catalyst comprises a transitional metal; and
wherein at least about 70% of the first metal oxide comprises an anatase crystal structure.

2. The catalytic material of claim 1, wherein the first metal oxide comprises $TiO_2$.

3. The catalytic material of claim 1, wherein the metal catalyst comprises one metal selected from the group consisting of Fe, Co, Ni, Ru, Rh, Pd, Os, Ir, Pt, Au, Ag, and Cu.

4. A process of producing the catalytic material of claim 1, comprising:
(a) forming amorphous material of a first metal oxide;
(b) crystallizing said first metal oxide into particles of about 4 to about 15 nm;
(c) controlling the level of surface hydration of said metal oxide particle to a range of about 5 to about 100 mg per gram of the dry first metal oxide;
(d) depositing a metal catalyst precursor to the first metal oxide from (c); and
(e) converting the metal catalyst precursor to a metal catalyst.

5. A method of purifying air by removing contaminants containing organic, inorganic, and/or biological species in the air, the method comprising contacting the contaminants with the catalytic material of claim 1.

6. A catalytic material, comprising:
$TiO_2$ and a metal catalyst comprising Au,
wherein the $TiO_2$ has
(a) size of about 4 to about 15 nm;
(b) crystallinity greater than about 60%; and
(c) a surface of hydration of about 5 to about 100 mg per gram of the dry metal oxide;
wherein at least about 70% of the $TiO_2$ comprises an anatase crystal structure.

7. A catalytic material, comprising:
a first metal oxide, a second metal oxide and a metal catalyst;
wherein the first metal oxide comprises nano-sized crystal particles having
(a) size of about 4 to about 15 nm;
(b) crystallinity greater than about 60%; and
(c) a surface of hydration of about 5 to about 100 mg per gram of the dry first metal oxide;
wherein the second metal oxide is deposited onto the surface of the first metal oxide and forms monomeric or oligomeric form on the surface of the first metal oxide; wherein the metal catalyst comprises a transitional metal; and wherein at least about 60% of the second metal oxide is in monomeric form.

8. The catalytic material of claim 7, wherein the first metal oxide is one selected from the group consisting of $TiO_2$, $SiO_2$, $Al_2O_3$, $ZrO_2$, and $WO_3$.

9. The catalytic material of claim 7, wherein the second metal oxide comprises a transitional metal.

10. The catalytic material of claim 7, wherein the second metal oxide is one selected from the group consisting of vanadium oxide, manganese oxide, chromium oxide, molybdenum oxide.

11. The catalytic material of claim 7, wherein the metal catalyst comprises one metal selected from the group consisting of Fe, Co, Ni, Ru, Rh, Pd, Os, Ir, Pt, Au, Ag, and Cu.

12. A catalytic material, comprising:
   a first metal oxide selected from the group consisting of $TiO_2$, $SiO_2$, $Al_2O_3$, $ZrO_2$, and $WO_3$, said first metal oxide having
   (a) size of about 4 to about 15 nm;
   (b) crystallinity greater than about 60%; and
   (c) a surface of hydration of about 5 to about 100 mg per gram of the dry first metal oxide;
   a second metal oxide selected from the group consisting of vanadium oxide, manganese oxide, chromium oxide, molybdenum oxide, and
   a metal catalyst comprising one metal selected from the group consisting of Fe, Co, Ni, Ru, Rh, Pd, Os, Ir, Pt, Au, Ag, and Cu,
   wherein the second metal oxide is deposited onto the surface of the first metal oxide and forms monomeric or oligomeric form on the surface of the first metal oxide; and wherein at least about 60% of the second metal oxide is in monomeric form.

13. A process of producing the catalytic material of claim 12, comprising:
   (a) forming amorphous material of a first metal oxide;
   (b) crystallizing said first metal oxide into particles of about 4 to about 15 Nm;
   (c) controlling the level of surface hydration of said metal oxide particle to a range of about 5 to about 100 mg per gram of the dry first metal oxide;
   (d) depositing a second metal oxide to the first metal oxide from (c);
   (e) depositing a metal catalyst precursor to the second metal oxide; and
   (f) converting the metal catalyst precursor to a metal catalyst.

14. A method of purifying air by removing contaminants containing organic, inorganic, and/or biological species in the air, the method comprising contacting the contaminants with the catalytic material of claim 12.

15. A catalytic material, comprising:
   $TiO_2$, $V_2O_5$, and Au, wherein the $TiO_2$ has
   (a) size of about 4 to about 15 nm;
   (b) crystallinity greater than about 60%; and
   (c) a surface of hydration of about 5 to about 100 mg per gram of the dry $TiO_2$;
   wherein the $V_2O_5$ is deposited onto the surface of the $TiO_2$ and forms monomeric or oligomeric form on the surface of the $TiO_2$; and wherein at least about 60% of the $V_2O_5$ is in monomeric form.

* * * * *